(12) United States Patent
Samid

(10) Patent No.: US 10,467,522 B2
(45) Date of Patent: Nov. 5, 2019

(54) ROCK OF RANDOMNESS

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 15/898,876

(22) Filed: Feb. 19, 2018

(65) Prior Publication Data
US 2018/0307963 A1    Oct. 25, 2018

Related U.S. Application Data

(60) Provisional application No. 62/514,905, filed on Jun. 4, 2017, provisional application No. 62/544,848, filed on Aug. 13, 2017, provisional application No. 62/473,324, filed on Mar. 18, 2017, provisional application No. 62/608,481, filed on Dec. 20, 2017, provisional application No. 62/581,752, filed on Nov. 5, 2017, provisional application No. 62/580,111, filed on Nov. 1, 2017.

(51) Int. Cl.
| | |
|---|---|
| *G06K 19/08* | (2006.01) |
| *G06F 21/72* | (2013.01) |
| *G06F 17/50* | (2006.01) |
| *G06F 21/60* | (2013.01) |
| *B33Y 50/02* | (2015.01) |
| *G06K 19/067* | (2006.01) |
| *G06F 21/73* | (2013.01) |
| *B33Y 70/00* | (2015.01) |
| *G05B 19/4099* | (2006.01) |
| *B33Y 80/00* | (2015.01) |

(52) U.S. Cl.
CPC ............ *G06K 19/086* (2013.01); *B33Y 50/02* (2014.12); *G06F 17/50* (2013.01); *G06F 21/602* (2013.01); *G06F 21/72* (2013.01); *G06F 21/73* (2013.01); *G06K 19/067* (2013.01); *B33Y 70/00* (2014.12); *B33Y 80/00* (2014.12); *G05B 19/4099* (2013.01); *G06F 2221/2153* (2013.01)

(58) Field of Classification Search
CPC ........ G06F 17/50; G06F 21/602; G06F 21/72; G06F 2221/2153; G06K 19/067; G06K 19/086
See application file for complete search history.

(56) References Cited

PUBLICATIONS

"The "Rock of Randomness": a physical pracle for securing data off the digital grid." (Gideon Samid et al., Feb. 4, 2019).*

* cited by examiner

*Primary Examiner* — Seung H Lee

(57) ABSTRACT

A system that efficiently packs indefinitely large quantities of random data in sufficiently identical physical entities ("Random Rocks", "Rocks") so that all holders of a matching Rock will extract from it the same data, in response to the same data request, ("query"); the packed random data is inherently analog, not digital, in form; the Rock always responds with the same data to the same data request, which must be presented one request at a time.

17 Claims, 12 Drawing Sheets

$R(a,b) = \dfrac{\Delta V}{i}$

Randomized Resistance $$R(a,b) = \frac{\Delta V}{i}$$

Randomized Resistance $$R(a,b) = \frac{\Delta V}{i}$$

Randomized Resistance $$R(a,b) = \frac{\Delta V}{i}$$

Randomized Resistance

Fig-2:
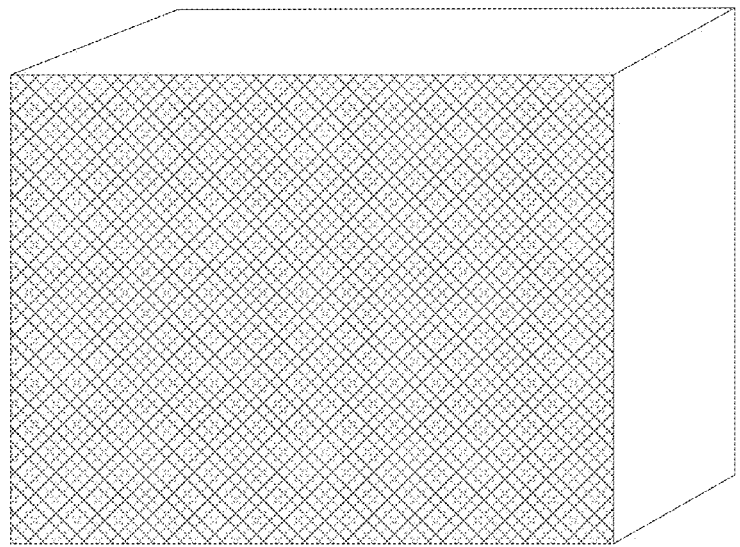
The Figleaf Brick with marked electrode point on frontal surface
Fig-3: Marked Randomized Selection by Privacy Seekers
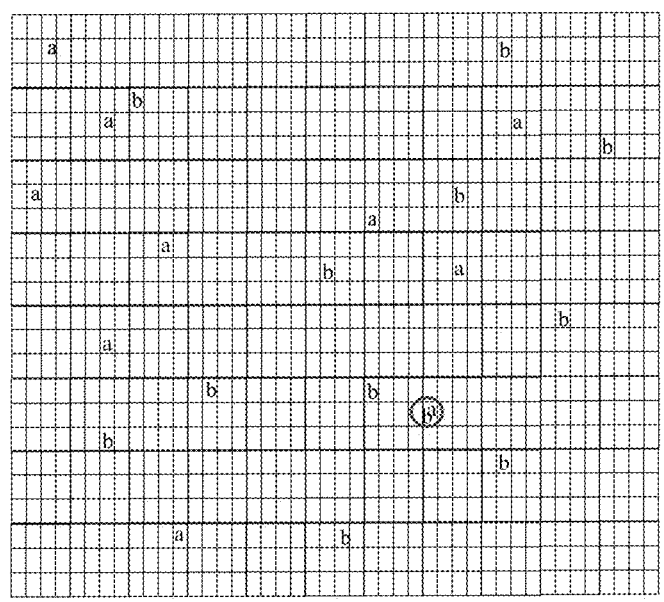

Fig-4: Alice Chooses a Projection Point (p) and Measured the Respective Currents
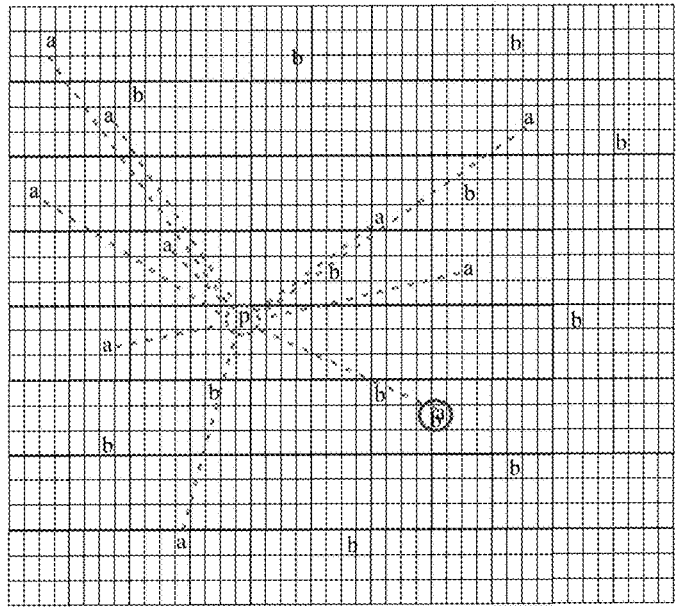
Fig-5: Bob's Chooses a Projection Point (p) and Measured the Respective Currents
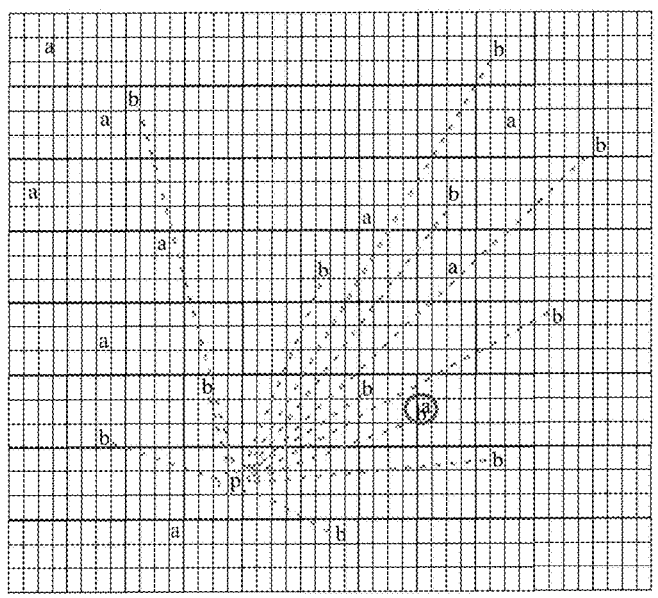

A FigLeaf Brick of Randomized Shape
(8 faces)

FigLeaf: Spontaneous Security
Public Reference Set

3D Printing of FigLeaf Bricks 3D printing of random rocks

Randomness Enhancing Sliding Rods

Fig.-13
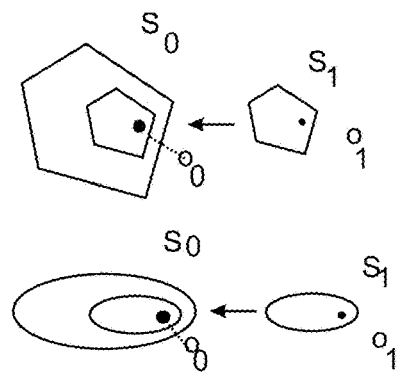
Defining an Encapsulating Box
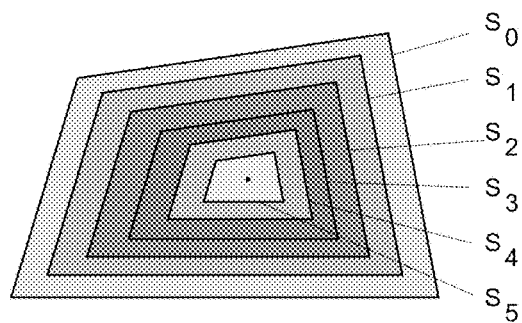
Fig.-14  Defining Onion Rings in a Random Block
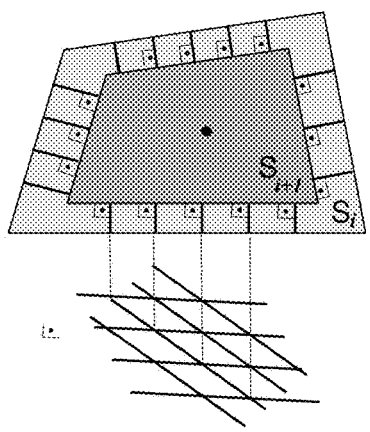
Fig.-15  Lattice Based Division of a Box to Blocks Fig.-16
Fig.-17:
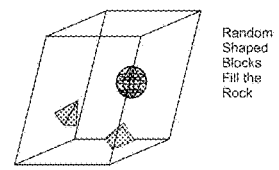
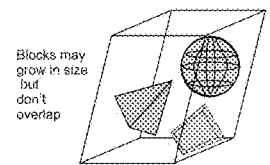
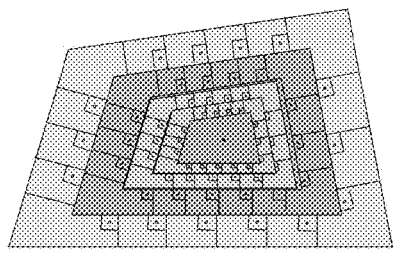
Lattice Based Division of a Rock
*Each box may be divided with its own lattice*
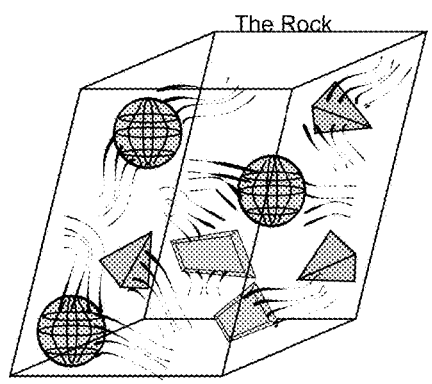
Fig.-18   "hopper" method to dividing the rock into blocks.
Fig.-19
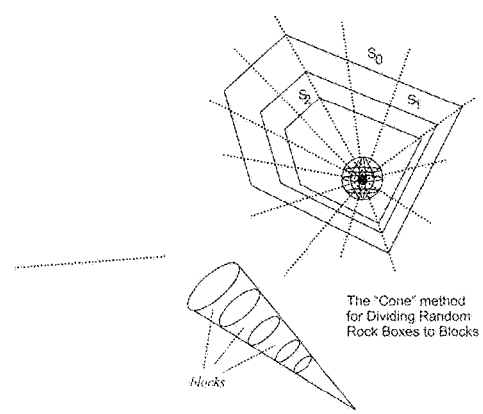

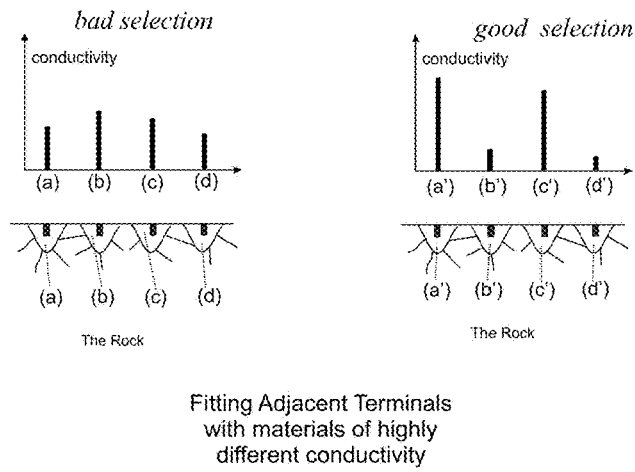
Fitting Adjacent Terminals with materials of highly different conductivity
Fig.-20
Fig.-21
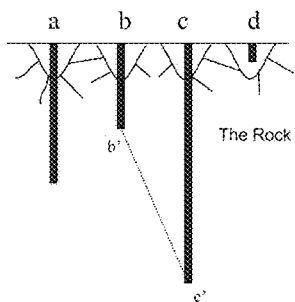
Variable Depth Pins blur physical proximity information between terminal points
Fig.-22
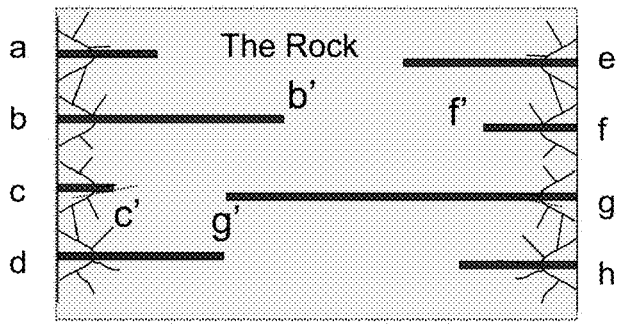
Variable Pin Length – Opposite Faces Fig.-23
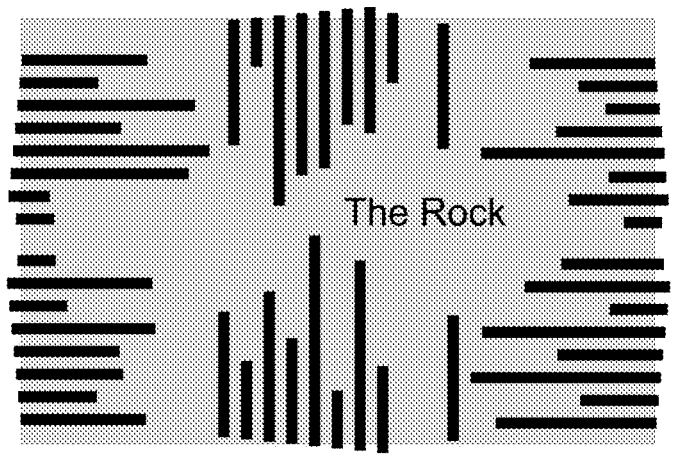
Variable Length Pins - Multi-Face
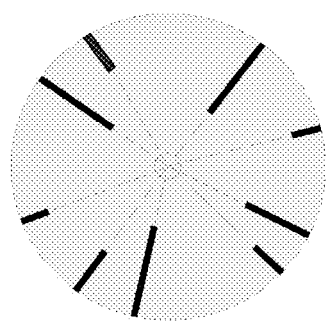
Fig.-24 Variable Depth Pins over Ball-Shaped Rock A Simple Topological Randomness Rock Complex Topology Randomness Rocks Terminal Plate Metals as Rock Comprising Materials Fig.-29
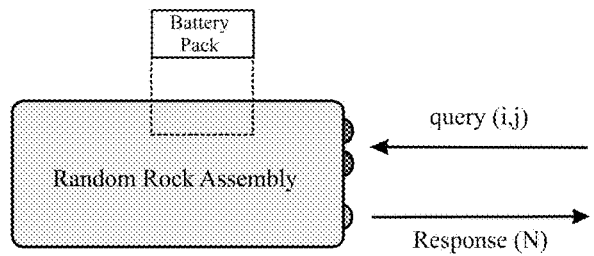
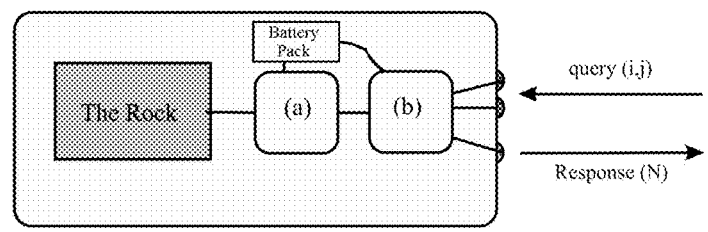
Random Rock Assembly
Fig.-30
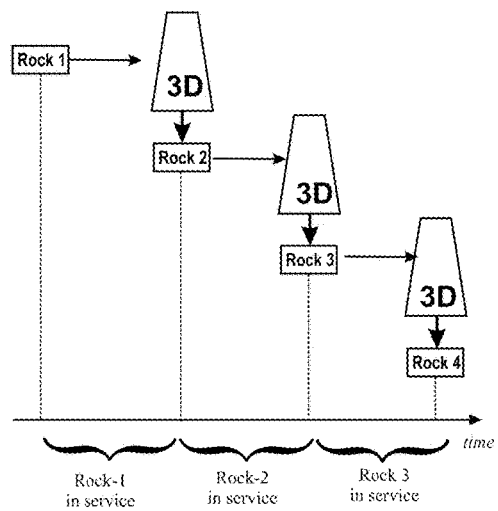
Rock Relay Mode

ROCK OF RANDOMNESS

INTRODUCTION

Cyber security protocols are invariably hinging on a large supply of shared randomness between the communicating parties. Such supply is nominally provided via flash drives or similar, easy-read, easy-query bit storage technologies. The pending risk of such shared randomness is that a copy thereof has found its way to an adversary, voiding it security.

It is therefore important to share randomness in a way that would make it difficult for such 'silent fraud'. This is what the randomness rock is all about.

The underlying idea for the rock is its physicality: it carries its information content implicitly rather than explicitly, and hence this so held information requires the presence of this physicality, this rock. Alas, one would argue, if the rock can release its information, even if bit by bit, then it can be exhaustively queried and the answers can be properly tabulated to create an equivalent oracle. This premise is of course true in principle. However, a physical device, even a small one, can be made to contain so much information that it renders its explicit mirror to be infeasible on several levels: (i) on sheer ability to log all these very many bits, (ii) on the time it takes to copy the implicit information into explicit tables, (iii) on the conditions, the equipment and facilities needed to accomplish this task.

Copying the data is one way to compromise it, duplicating the contraption, the rock, is another. The Random Rock is designed to withstand unauthorized duplication.

In summary, we have here a physical element that contains shared randomness in an implicit form that requires its presence. The device, the randomness rock, resists unauthorized duplication, and contains too much information that resists 'wholesale' queries, rendering their extraction infeasible. These features upgrade the security level associated with such shared randomness. One just needs to keep these rocks in a secure physical confine, and thereby its content is protected from attack.

FIG. 1 depicts the basic manufacturing of the randomness rock.

PRINCIPLES OF OPERATION

The Random Rock is comprised of a mixture of variant-electrical conductivity materials, such that the electrical resistance measured between two arbitrary points on the surface of the rock depends on (i) the electrical conductivity of the comprising materials, on their relative geometry within the rock, and on any electrical interaction across shared surfaces. Two or more sufficiently identical rocks will log the same electrical resistance between the very same points on each respective rock.

Using modern technology it is possible to construct any desired count, (C), of sufficiently exact duplicates of such a rock where the relative geometry of the comprising materials will be properly randomized. The C rocks may then be distributed to C communicating parties. Each party then will be able to pull shared randomness from the rock by indicating in the open the location of the two points between which to measure the resistance. Each of the C communicating parties will be measuring the resistance on its own rock, and the result of this measurement will be the shared randomness among the C communicating parties. Why randomness? Because the original geometric layout of the comprising materials was carried out via a proper random number generator, and therefore the reading of the resistance between the two designated points, will also be random, and a secret shared between the rock holders, hidden from anybody else.

We further propose to upgrade the rock with "sliding conductor rods". In order to increase the amount of randomness that is housed by the rock, we propose to drill holes inside it, and fit disruptive rods that would slide into these drilled holes in a variable measure. The rods' position will span from remaining outside the holes to sliding completely inside the holes. The sliding status of these rods will affect the reading of the resistance between any two arbitrary points. While the randomness that generated the composition of the rock is shared, secret, and hidden, the status of the sliding rods can be also determined randomly by an initiating party (among the C communicating parties), and shared openly, so that each party will know how to set the position of the rods to get the same resistance reading as the other parties.

The sliding rods enhancement will frustrate any adversary trying to take a measure of the resistance between all possible pairs of points. There will be so many more combinations due to the large position variability of the rods, that pre-mapping will not be feasible.

We now continue with (i) mathematical analysis, (ii) manufacturing technology, (iii) applications (fig. leaf included), (iv) security analysis, (v) outlook Mathematical Analysis The rock is a randomized composition of its comprising materials. Its boundary is the surface where terminal points are marked.

At the operational level the Random Rock will function like an oracle. Two terminal points will be identified, (i,j), and a resistance reading, r(i,j) will be measured over the rock. The reading will have to be mapped into an integer $\rho(r)$, and $\rho$ will be the shared secret, or part thereof. Let us identify n terminal spots on the rock. This defines $n(n-1)/2$ pairs, which defines $n(n-1)/2$ readings, r(i,j). This analysis refers to the fixed rock construction without the sliding rods. Among the $n(n-1)/2$ readings there is a highest, reading $r_h$, and the lowest reading $r_l$. Based on the accuracy of the reading device, the fidelity of the duplications of the rock, and the environmental impact, one can identify an "interval of fluctuation" $\delta r$, which reflects the expected difference in actual readings between the various parties, each holding a different copy of the same rock at a different location. Based on $\delta r$ one can identify an "interval of accuracy" (IOA), as some multiplier of $\delta r$, (IOA=k*$\delta r$) as an interval of resistance readings that will be comfortably larger than the error span of readings among the communicating parties. The parties will then agree on a reference reading $r_m$, which should be close to the middle point between $r_l$ and $r_h$: $r_m \sim 0.5(r_h - r_l)$. Once $r_m$ is agreed upon, then it may serve as an anchor to define IOA intervals higher and lower than $r_m$. Once so, then any reading of resistance between $r_l$ and $r_h$ will fit into one IOA interval. The intervals may be enumerated to facilitate the translation of r(i,j) to $\rho(i,j)$=-q, -(q-1), -(q-2), . . . -1, 1, 2, . . . q. where $2q \leq (r_h - r_l)/IOA$.

An arbitrary reading of resistance, r, will be found to be: $r_m + (k-1)*IOA < r < r_m + k*IOA$, and translated to $\rho(r)$=k. Or found to be: $r_m - (k+1)*IOA < r < r_m - k*IOA$, and translated to $\rho(r)$=-k.

Dynamics.

Any party among the c communicating parties will randomly choose two terminal points, (i,j), and measure the electrical resistance between them, r(i,j). Based on the shared values of $r_m$ and IOA, the measuring party will check if the reading r(i,j) is too close to an "interval flip point". And interval flip point (IFP) is defined as a reading of resistance, r, such that a reading r'<IFP, translate to different interval than a reading r">IFP: $\rho(r') \neq \rho(r'')$. In other words, an IFP value is the value that serves as the higher boundary for one IOA interval and the lower boundary for another IOA interval. If $|r(i,j)-IFP| \leq \delta r$, then there is risk that the reading errors among the communicating parties will result in one or some communicating parties translating the r(i,j) to an integer $\rho(i,j)$ different from the rest. Therefore, if the reading r(i,j) is too close to an IFP, this reading should be discarded, and the measuring party should randomly choose a different pair (i',j'), and again discard it if the corresponding reading r(i',j') is too close to an IFP, and repeat choosing pairs of terminals until a reading comes forth that is not too close to an IFP. The parties may agree on a measure of "too close", namely on a value of k such that: $|r(i,j)-IFP|>k\delta r$.

Following the above procedure the parties will be able each to initiate a sequence that would generate a shared secret, integer $\rho$, which can be used as such, or be part of a larger secret built up by repeating this procedure as many times as desired.

For this contraption to work it is necessary that the interval $(r_h-r_l)$ will be large enough (the measuring span), and it is further necessary that an adversary who knows everything about this procedure, except that she does not possess the rock itself, will not be able to deduce or to learn anything consequential about the measured value r(i,j).

We shall assume that the adversary knows the values of $r_h$ and $r_l$ (the limits awareness assumption). We further assume that the adversary knows, or has a good guess of $\delta r$, and hence can come up with a good guess of the IOA. We further assume that the adversary discovers the value of the reference reading, $r_m$. With all that knowledge the adversary can readily translate a reading r(i,j) to its corresponding interval $\rho(i,j)$.

For the contraption to project maximum security, it is necessary that for each pair of terminal points (i,j), the chance for the corresponding integer reading $\rho(i,j)$ will be $\frac{1}{2}q$. In other words, every reading among the 2q possible values will have the same likelihood to be the reading associated with an arbitrary pair (i,j).

This equi-distribution will have to be provided, or sufficiently approximated for by the randomness rock construction to function as intended.

Rock Construction

The randomness rock is built with c distinct comprising materials. $M_1, M_2, \ldots M_c$. They each have a distinct electrical conductivity index $\sigma_1, \sigma_2, \ldots \sigma_c$, such that $\sigma_i \neq \sigma_j$ for every $i \neq j$. The choice of the participating materials will be such that no two conductivities indices will be too close to each other: $|\sigma_i-\sigma_j|_{min}>\gamma$, where $\gamma$ is a boundary limit of closeness. $I,j=1, 2, \ldots c; i \neq j$.

The measured conductivity (or resistance) between any two points on the rock, depends on the distribution of the c comprising materials, as they spread out between the two terminal points. This distribution will be determined via a high quality random number generator (RNG) that will guide a manufacturing procedure to manufacture sufficiently identical t rocks. The randomness of the distribution of the c materials will be translated into randomness of the resistance reading between any two arbitrary points on the rock.

We analyze below the rock composition randomness requirements.

Rock Composition Randomness Requirements.

Let's first review the boundary conditions. Let the participating materials be organized such that $\sigma_1>\sigma_2> \ldots \sigma_c$, namely organized in declining conductivity. Let us further agree on some naming order to mark the n terminal points: $i,j=1, 2, \ldots n$ If the rock is comprised of material k only then the resistance r(i,j) will be dependent only on the geometry of the rock between points i and j. Furthermore, there would be a close proximity between r(i,j) and r(i+$\eta$, j+$\eta$), where $\eta=+1, +2, +3, -1, -2, -3$. Namely by moving one terminal to a neighboring terminal point the new reading will be close to the former one—randomness lost.

This loss of randomness will apply, no matter which of the c materials has been chosen. We may be cautious and assume that the external geometry of the rock (its dimension) are known to the adversary and hence she could build a replica of the rock, and if she knows the code for identifying the terminal points then she could arrive at the right measurement and uncover our secret.

Let's now analyze the opposite case, where all c materials are being thoroughly mixed when constructing the rock. In this case, one again achieves homogeneity, and the reading r(i,j) will be dependent only on the geometry, the positions, of i and j versus the geometry of the rock, and again the adversary could build a replica of the rock, assuming she knows all the materials we selected $M_1, M_2, \ldots M_c$.

We conclude then that "no mixing" and "thorough mixing" are inappropriate for our aim. What is needed is incomplete mixing to generate sufficient randomness in the set of measurements.

Incomplete Mixing

To meet the challenge of incomplete mixing we shall first entertain the challenge of optimal configuration (mixing). Given arbitrary, but well defined external shape of the rock, and given the positions of the n terminal points on its surface, and also given the set of c participating materials, $M_1, M_2, \ldots M_c$, with known conductivity indices $e_1, e_2, \ldots e_c$, one would define an exact criteria for rating efficacy of different mixing configurations. Shannon entropy can be used here, or alternatively, as follows: for a given mixing configuration, and for each proximity distance $|i-j|=d$, let us build a histogram h(x), where x reflect the $\rho$ value, hence $1 \leq x \leq 2q$, and h(x) reflects the number of pairs for which the measured value for $\rho$ is x. There are $n(n-1)/2$ such pairs hence:

$$\sum_{d=1}^{d=n-1} \sum_{x=1}^{x=2q} h(x, d) = \frac{n(n-1)}{2}$$

One could use standard regressions of these histograms relative to a horizontal line, and use the standard deviation from such a line as the metric for the quality of distribution of resistance values. The idea case is when for each pair of terminal points (i,j) the chance for any value of $\rho$ is $\frac{1}{2}q$: $Pr[\rho]_{i,j}=\frac{1}{2}q$. for $i,j=1, 2, \ldots n$.

While a pure mathematical calculation appears quite intractable, this challenge lends itself easily toward a standard optimization; whether based on mathematical modeling or based on actual experimentation.

If there is one such optimal configuration, then, it should NOT be used by the rock builder. The reason is that the adversary, aware of the dimensions of the rock will be able to also arrive at that optimal configuration and use it to uncover the secret. This leads to a strange situation—the mixing which leads to optimal distribution of the measured values—optimal in the sense that it would be most intractable for an adversary to guess—is in fact a bad choice because it is based on mathematical insight which the adversary is assumed to possess.

There is a distinct possibility that there will be more than one such configuration where the distribution is optimal. In that case it will be a bit more challenging for the adversary to go through all these options, but no prudent rock builder will use any of these mathematically optimal configurations.

We have in summary a situation where the two boundary states (no mixing, and full mixing) are bad choices, but also the mathematically optimal mixing is a bad choice. And hence we are looking for suboptimal cases that are numerous enough to be sufficiently intractable for discovery by an adversary.

On further thought, the mathematical complexity of resolving this challenge of optimal mixing is the ground argument for the efficacy of the rock. It is to be constructed in some well randomized fashion which can not easily enough be modeled mathematically. It would also lead one to an experimental approach.

Experimental Configuration

The experimental configuration strategy will set up some r mixing configurations: $z_1, z_2, \ldots z_r$, and for each configuration one will measure randomly w pairs selected from the $n(n-1)/2$ possible pairs. These w measurements will build a histogram $h(x)$, where $\Sigma h(x)=w$ for $x=1, 2, \ldots 2q$, and the r histograms will be evaluated as to how flat they are. The "flatness" of these histograms (measured by standard deviation off a horizontal line), will be taken as the metric of the utility of the z-configurations represented by the histogram: $u_1, u_2, \ldots u_r$. The set $z_1, \ldots z_r$, and $u_1, \ldots u_r$ will be the basis of optimization where the high utility configurations will be a basis for a Monte Carlo optimization in their mathematical neighborhood. After several rounds of such optimization, the rock builder will establish a procedure to set up a high utility mixing configuration. This configuration style will be implemented with significant randomized input to make the actual reading of the rock, substantially random.

Ahead we will explore plausible such mixing configuration styles.

Mixing Configuration Styles

We define a randomness rock configuration style as a procedure that determines a mixing state of selected c participating materials with known electrical conductivity indices: $e_1, e_2, \ldots e_c$.

We define two categories of mixing configuration styles: (i) entropic mixing, and (ii) Pre Blocked mixing. The former calls for partial mixing of the participating materials, such that they don't reach a homogenous state, and the latter is based on setting up blocks in which a single participating material will be filled per block. The two categories are analyzed ahead. The procedure will be comprised of arbitrary design parameters combined with randomized input.

Entropic Mixing

Entropic mixing is a mixing process of some c ingredients such that the level of mixing is (i) well defined, and (ii) operationally controlled. A perfect mix of some c ingredients is one where for very small units of volume, each of the c components will be present in amounts reflective of its relative ratio. An imperfect mix is where many quite large units of volume where the mix is present have only some, not all, of the mixed ingredients.

There are several mathematical methods to quantify the degree of imperfect mixing. One of them is the symmetry based randomness definition [Samid 2017], which rates any partial (imperfect) mix of c components as to the degree of randomness (perfect mixing) associated with them.

For an entropic mixing to be practical it is necessary to be in possession of a mixing apparatus where one could input a desired degree of mixing, and have the mixture come out with that degree in a uniform way.

Using this method the rock builder could decide on an optimum and effective degree of mixing of the c participating materials, and then generate such a mixture, which will then will have to be copied and duplicated.

It is duplication that keeps this method in a disfavored light. However, for unshared randomness this aspect is moot, and the entropic mixing is very effective.

Pre-Blocked Mixing

Pre blocked mixing can take place in two ways: (i) fixed geometry blocks, and (ii) randomized geometry blocks. The first category amounts to establishing blocks, zones inside the rock, and then allowing a randomized selection to select which participating material will be filled into each block. The second category will allow a randomized selection of the boundaries of each block, and then randomized filling.

A few options discussed.

The Onion Layers

This procedure calls for viewing the random rock as constructed from cascading, encapsulating boxes. Let the rock be of some three dimensional shape, $S_0$. Let $S_1$ be a three dimensional body of same shape and proportion, only shrunk in size. We say $S_1 < S_0$. Let $o_0$ be the center point (the origin) of $S_0$, where the definition of this point can be set arbitrarily. We may agree on the point of the center of gravity for the shape, had it been constructed from a homogenous material. Similarly we define the center point $o_1$ for $S_1$. Let us now place the two shapes such that $o_0$ coincides with $o_1$, and the respective faces are parallel. This will define an enclosure space comprised of all the parts of $S_0$ that are not included in $S_1$. We call this section of $S_0$ as $Box_0$.

It is easy to show that such placement of $S_0$ and $S_1$ will define an encapsulating area. We first show that such placement of $S_0$ and $S_1$, will guarantee that all the points of $S_1$ are included in $S_0$. This is because $S_1$ is a "shrunk" version of $S_0$, and hence any straight line between an arbitrary point on the boundaries of $S_1$ and $o_1$ is shorter than the straight line between the corresponding point on the boundary of $S_0$, and $o_0$ (=$o_1$). Therefore the entire surface of $S_1$ is included inside $S_0$. And since $S_1$ is comprised of one contiguous body, at the center of both $S_0$ and $S_1$, it is necessary that the points of $S_0$ which are not included in $S_1$, comprise an encapsulating, ring-like box.

In a similar way we can define shapes $S_2, S_3, \ldots S_i, \ldots S_w$, each is a proportionally shrunk version of its former. And every two successive shapes $S_i$ and $S_{i+1}$, will define the space section which is part of $S_i$ and and not part of $S_{i+1}$, to be called $Box_i$. This iterative process will stop at shape $S_w$.

Each $box_i$, of the w boxes so defined may be defined to box $b_i$ sub-sections, "blocks", such that together with $S_w$ this process will define $\beta = \Sigma b_i + 1$ subdivisions of the original rock shape, $S_0$.

Once the rock is divided to $\beta$ subsections, one would activate a randomized process to fill each of these blocks with a randomly selected material out of the c comprising materials. Such selection will completely define the rock.

We now complement this definition with elaboration on methods to define blocks within the boxes.

Dividing Boxes into Blocks

There are several ways to doing so. We discuss (i) lattice, (ii) cones. In the first method, one identifies a two dimensional lattice, through two series of parallel lines at given distances, and then mapping that lattice on the inner surface of each box. The lattice is then projected perpendicular to the its surface until the perpendicular walls touch the outer surface and thereby divide the encapsulating box to blocks. The inner section, $S_w$, is regarded as one block. This procedure assigns a box to every point that comprises the box.

In the "cone" method, one divides the $4\pi$ surface area of an imaginary unit sphere with a center at $o_0 = o_1 = \ldots = o_w$, to $\beta/w$ sections. These sections, each appears like a cone where the head is in the combined center of the sphere and the w boxses, and from there each of the $\beta/w$ coins is projecting outwardly, such that each cone intersects with the inner and outer surfaces of all the boxes. This gives rise to partition of the rock to $\beta$ sub sections. The division of the $4\pi$ surface area to $\beta/w$ sections will be controlled by a randomized process to boost the randomness input into the rock.

The Floating Blocks

This method amounts to random selection of $\beta-1$ three dimensional bodies of random shapes, randomly selecting a placement position for them in the rock, then adjusting their size to fit into the rock, without overlapping any rock area occupied by previously placed blocks. These $\beta-1$ blocks plus the leftover section of the rock count to $\beta$ sections that fully comprise the rock.

Having placed (i−1) blocks in the rock, the builder now randomly identifies a three-dimensional shape, $b_i$, (say a box, a sphere, a pyramid), and randomly places $b_i$ inside the rock. If $b_i$ is exceeding the limits of the rock, or if it overlaps any area covered by the previous blocks: $b_1, b_2, \ldots b_{i-1}$, then $b_i$ is shrunk in size while keeping its shape in tact. This shrinking continues until either the resulting shrunk $b_i$ does not overlap any previously claimed section of the rock, and does not exceed the rock's boundary, or until the size of the shrunken block is below a preset limit on the block size. In the latter case, either the process of adding block stops, or it is being tried again with the same or a different randomly selected shape and a newly randomized location.

The lower limit on the size of the block is necessary because as we analyzed before, as the block sizes grow smaller, the situation comes closer to perfect mixing, which we have seen is wiping away the variance of the resistance measurements, which is the object of this procedure.

The Hopper

Using this method one will randomly select $\beta-1$ three-dimensional bodies $b_1, b_2, \ldots b_{\beta-1}$, such that their total volume is "sufficiently less" than the volume of the rock. The $\beta-1$ pieces are then thrown into the rock as a container, and the container then is being shaken until at one point the shaking stops, and the $\beta-1$ blocks are somehow piled up inside the rock. They together with the left over area of the rock comprise $\beta$ sections that completely divide the rock.

The shaking of the box is done mathematically with proper randomization.

Terminal Construction

The rock contraption will use a conversion table to hide the physical proximity of terminals from the query presenter, but this table has to be assumed as compromised, and hence it is important to minimize the information leak due to knowledge of physical proximity of terminals. The idea being that if one shifts a terminal physically to an adjacent terminal then the reading will be quite similar. Let the n terminals be listed by physical proximity: $t_1, t_2, \ldots t_n$. Namely, the on the rock physical distance between $t_i$ and $t_j$ is roughly proportional to $|i-j|$: $d_{ij} \sim \alpha^*|i-j|$ ($\alpha$—coefficient of proportionality). In that case knowledge of the resistance reading $r_{ik}$ for i, and k two arbitrary terminal points, will decrease the entropy of the unknown reading of $r_{jk}$, for small values of $|i-j|$. It this information leakage that one tries to prevent.

We describe two methods for that purpose that may be used independently or together: (i) terminal blocks, (ii) variable depth pin.

Blocks:

one would surround each terminal with a block to be filled by one of the c comprising materials of the rock. The material choices for adjacent terminals will be such that their conductivity indices is as different as possible. This defines a clear mathematical challenge. Let (i,k) be two arbitrary terminal points on the rock. Let j=−L, −(L−1), −1, 1, 2, L, where L is an arbitrary small number, say L=4. Let an attacker be aware of all the resistance reading: r((i+j), k), for all values of j. That attacker will now try to estimate the resistance value r(i,k). The extent that such an estimate is carried out with no more credibility than without the knowledge of the r((i+j),k) is the extent to which the adjacency information does not leak. Given an established estimation procedure, a given adjunct situation, and c conductivity values, there exists a mathematical solution to minimize the adjancey leakage. It applies for rocks comprised of semi conductors.

Variable Depth Pins

Every terminal point i may be extended with a disruptive pin to a randomly variable depth, $d_i$. This will render the distance gap between terminal point i and terminal point i+1, g(i,i+1), to be proportional to the gap between $d_i$ and $d_{i+1}$: $g(i,i+1) = \alpha^*|d_i - d_{i+1}|$, where $\alpha$ is a proportionality coefficient. The gap will blur the proximity relationship between the terminals, and will make it more difficult to guess resistance based on neighboring readings.

The pin heads will have to stay mutually apart, and remain inside the confines of the rock. Using the variable depth pins (VDP), will impact the shape and form of the rock itself.

Conductivity Selection

The greater the variety in the conductivity indices, the larger the randomized reading from any pair of terminals. This is easy to show. In the extreme case where all conductivity indices are the same: $c_1 = c_2 = \ldots = c_t$, then by replacing all occurrences of material i in the rock with material j (i≠j) there will be no change in the readings of the resistance between any pair of points on the rock. And hence only the geometry between the terminals will determine resistance, and any change of material content will not have any effect.

With the same logic, let material i and a different material j be of similar conductivity $|c_i - c_j| \to 0$, then replacing all occurrence of i with j or vice versa will not have any impact on the readings of the rock, and hence it makes no sense to include two materials of similar conductivity. One would then set up a conductivity difference minimum (CDM) and select c materials such that no two materials i and j will have conductivity values closer than CDM: $|c_i - c_j| \leq \text{CDM}$ If a set of c materials will have two materials with conductivity values too similar (smaller difference than CDM), then one of them will be taken out from the set, or the two will be mixed into a new composite material with conductivity at the average point relative to the conductivity of the two mixed ingredients.

Rock Design and Manufacturing Technology

The design of the randomness rock and its manufacturing has the following parts:

Design of the rock design and manufacturing of the comprising materials design and manufacturing of the assembly of comprising materials—rock construction design and fitting of the reading terminals
design and manufacturing of the reading operation
Assembly Engineering
disposal Design of the Rock For the random rock as a whole we need to address the questions of (i) size and (ii) shape.

Size: the smaller the size the greater its use flexibility and hand-ability. And hence the use purpose affects the size. It may be small enough to fit in an electronic board, or it may be a: "brick size" to fit in a large server farm. The more data to be packed into the rock, the larger its size. The more refined the terminal fitting technology, the smaller the rock can be.

From sheer security consideration one would opt for a considerable size to make it difficult to steal and confiscate.

Shape: There is no clear restriction on the shape of the random rock. We discuss examples: (i) "brick" style rock, and (ii) "ball" size rock, (iii) topological rocks.

Brick Style Rock

This is a natural shape, a brick fits nicely in a packaged assembly. A brick has six faces, each of which may be fitted with terminals. Alternatively only four or two faces may be fitted with terminals. One could limit the choice of a terminal pair to two opposite faces in order to insure enough material between the terminals, where the randomized order of the comprising materials will manifest itself.

A flat face, as is the case of a brick, makes it easy to build a wire mesh or an integrated circuitry as the array of terminals, and selecting a particular terminal by a specific selection of two perpendicular wires (side terminals) that intersect over the selected terminal.

The brick may be designed to connect between any point to any point (as described in the mathematical analysis section) but it can also be restricted to defining a pair by selecting one terminal point from one face of the brick and the other terminal point from the other face of the brick. The latter gives more latitude to the variable length pin implementation.

Ball Style Rock

A ball shaped rock will maximize the volume of the rock per a given surface area. For a given terminal fitting technology and a given terminal count (n), a ball provide the largest mass. The ball also allows for maximum flexibility in implementing the variable length pin strategy. A ball can be replaced by a multi-faced polyhedron.

Topological Rocks

Rocks of unusual shapes will be regarded as "topological". Of particular interest is the "holed rock" where the bulk of the rock is drilled with holes such that the inner walls of these walls may be used for fitting terminal points. This will increase the capacity of the rock per volume. It may be implemented with a restriction that pairs of terminals will have to pick one from the inner walls of the holes and one from the external walls. See Size Considerations The larger the rock, the more terminal points can be fitted on it, and the larger the amount of randomness that it packs. For use by server farms, size is not a big issue, but when fitted in small communication gear, size and weight become of great interest.

One may note that the randomness rock may be built with nano technology and be constructed of mini and micro dimensions. If a terminal point can be defined on a nano scale, then so can be the rock. The resistance variance will work over small scales as well. A rock can be huilt that apart from the power supply will be fitted on a pin's hat.

Design and Manufacturing of the Comprising Materials

The requirement is for conductors and semi conductors in a solid state, ideally free from any hazard of use or contact. The comprising materials will have to be resistant to deformation and distortion of any kind in normal handling temperatures. Their conductivity will have to be largely invariant with normal fluctuation of temperature.

An attractive category for these materials are macro molecules, which may be seeded with conductivity regulating atoms to create a spectrum of electrical conductivity.

Using similar macro molecules with some seeding adjustments (e.g. graphite) to generate different conductivity will also help the security issue as even upon breaking the rock up, it would be difficult to ascertain the borderline between two comprising materials.

One security advantage may be found in selecting comprising materials that build an electrical potential between their touching surfaces. Such electrical tension will impact the reading of the resultant resistance, and will make it more difficult to emulate.

The comprising materials will have to be clearly in the solid phase throughout the span of operating temperatures. Their conductivity should be the same in any orientation, and preferably be nontoxic.

In order to maximize the reading impact of each of the comprising materials, it is desirable to have equal conductivity intervals; $\sigma_i - \sigma_{i+1} \sim (\sigma_1 - \sigma_c)/(c-1)$, for $i=1, 2 \ldots (c-1)$. There are several strategies to choose from: (i) select equal conductivity intervals from the full range of materials, from super-conductors to super insulators, (ii) select equal conductivity intervals from conductors, or (iii) from semi-conductors, or (iv) non-conductors.

Here are conductivity values for conductors (S/m*$10^7$)

Silver 6.3 Copper 6.0 Gold 4.1 Aluminum 3.5 Calcium 3.0 Tungsten 1.8 Zinc 1.7 Nickel 1.4 Lithium 1.1 Iron 1.0 Platinum 0.9 Tin 0.9 Lead 0.5 Titanium 0.2

One choice could be: Silver, Gold, Calcium, Nickel, Titanium, with conductivities: 6.3, 4.1, 3.0, 1.4, 0.2, where the respective conductivity differences are: 1.8, 1.1, 1.6, 1.2~(6.3−0.2)/4=1.5

Metals have a very uniform conductivity, and unlike complex molecules have no issue of manufacturing uniformity. On the other hand their conductivity is more sensitive to temperature, which restricts the operational temperature span. It is also easier to decipher the structure of a metal rock, if a rock was compromised, relative to, say, conducting polymers, which also are less sensitive to temperature variance.

Doped macromolecules, and nano-composites, are known to affect the conductivity of macromolecular matrix, and as such are excellent candidates for comprising materials.

By way of reference: conductivity is an intrinsic property of materials. Conductivity ($\sigma$) is the reciprocal of electrical resistance: $\sigma=1/R$, where $R=rA/L$, r, the measured resistance $\Delta V/I$ (ratio between voltage difference and the resulting current), A—the cross-section of electrical flow, and l—the length between the terminals of a uniform material. Conductivity is measured in siemans (mho)/meter.

Design and Manufacturing of the Assembly of Comprising Materials

By far the most becoming rock manufacturing technique is three-dimensional printing. The mathematically defined rock may be fed to the printer for execution of as many duplicates as desired. When done, the blue print is destroyed to prevent additional printing.

Alternatively, only the blocks geometry will be predefined and then forwarded as software to a 3D printer. The printer in real time would randomly choose the identity of which comprising material to use to fill any current block being printed. This choice will have to be temporarily recorded to manufacture the number of desired duplicates.

Three-D printing technology is already developed enough to insure the proper tolerance among the manufactured rocks. When a series is completed the software driver for the blocks should be destroyed so no more rocks can be manufactured, and security can focus on the known number of rocks.

Today's technology of 3D printing is so advanced that a printing instruction package running on different machines will generate high-fidelity duplicates. This implies that a community of secure communicators does not have to rely on one manufacturing spot, and a subsequent physical distribution of the physical rocks, but rather rely on secure communication of the printing instruction package, and then, each party will generate its own rock. Of course the security of this strategy is limited by the security of communicating the printing instruction package, which can be achieved—poetically in a way—by using the secure randomness from a former rock. Hence, a community of secure communicators may end up communicating safely forever, by using one rock for to generate a high-fidelity copy of the next.

An alternate method is entropic mixing where the entropy is fixed throughout the mixture, but it does not produce identical units as required. This method is still useful for cases where the rock is built to generate unshared randomness, as many randomness-rich ciphers now demand. The entropic mixing will require the mixed materials to be: "mixable", namely of manageable viscosity during the mix, and them solidify afterwards. Because of its non-repeatability this method is ideal for unshared randomness Design and Fitting of the Reading Terminals.

It is mandatory that the location of the terminals will be well defined to insure accuracy of the readings. They will have to be physically disposed for the contact wire to fit into an exact location. We already mentioned that each terminal will likely be surrounded by a dedicated block with material as different as possible from its neighbors, in terms of electrical conductivity.

Another design option is to associate each terminal with a "variable depth pin"—a disruptive-conductivity thin extension that would extend to a random length into the body of the rock. One would use a randomization process whereby the depth values of adjacent or close by terminals is as different one from the other as possible, to break apart any similarity of reading on account of physical proximity.

One effective terminal fitting technology may be that of "Terminal Plates"—integrated circuitry fitted to faces of the rock.

Terminal Plates

A face of the random-rock may be snugly fitted with a plate that is overlaid by a matrix of connectors with transistorized switches at the points of intersection between horizontal and vertical lines. This will allow the user to identify any point of the matrix by tapping one horizontal and one vertical lines. The intersected switch will be the only one to be turned on, and thereby define a particular terminal point.

Design and Exercise of the Reading Operation

The challenge is to (i) randomly select terminals, (ii) create electrical contact at the terminal points, (iii) to measure the respective electrical resistance, (iv) to translate the reading to the corresponding secret integer. On the receiving end, it is necessary to spot the identified terminals and execute the reading.

One way to handle this task is to build a terminal conversion table. One would use a random number generator to select the identities of the two terminal points. The n terminal points may be listed 1, 2, . . . n, and each point may point from its serial number to an address location on the surface of the rock (the conversion table). In case of a "brick" the address will identify the face, and the horizontal and vertical lines that intersect at the point of the terminal. It is advisable to keep this address matching list secret to deny an adversary any information regarding proximity between points.

Measuring electrical conductivity is straight forward. The terminal points are fitted with a voltage difference, and current meter measures the resulting current. The effective resistance of the rock between these two points is the ratio between the voltage difference across the terminal points divided to the resulting current. In the mathematical analysis section we discussed how to translate the raw resistance reading into a shared integer secret.

Assembly Engineering

The random rock may be packaged to service assembly with entry for power supply and data ports for the query input and for the rock's response. The query is identified by specifying the identities of two terminal points on the rock, and the response is specified by an integer that reflects the corresponding measurement.

The rock assembly will be comprised of

The outer box

The power supply the rock per-se

The resistance measurement apparatus

The rock management and control board.

When the pieces are put together, there would be a need for priming the rock before use.

The Outer Box:

The outer protective box will be fitted with (a) a power entry either power wires, or a battery socket, (b) input ports, (c) output ports. The rock assembly may fit in a larger contraption, which it will serve by responding to queries with the corresponding integer output.

The Power Supply:

The power supply may be a standard battery in a fitting socket, integrated as part of the rock assembly box, or it may be a wiring port for external power supply.

The Rock Per Se:

Resistance reading in the rock is not affected by direction, disposition, elevation etc. Temperature may affect the reading, but such will be tested and a safe temperature range will be specified for use. The rock will be snugly fitted in a frame of matching configuration, and in a way that makes it convenient to assemble the terminal selection sub-system.

The Resistance Measurement Apparatus:

The resistance measurement apparatus is comprised of:

The terminal id conversion matrix

The resistance reading circuitry

The integer conversion unit

The output control circuitry

The Terminal Id Conversion Matrix is the unit that receives a generic id of the two terminals selected for reading, and then outputs the rock-position address of these terminal points. A random rock is identified by n, the number of terminal points. A random-rock query is defined by identifying two terminal points, $(i,j)$, such that i and j are integers where: $i \neq j$, $1 \leq i,j \leq n$. In other arrangements n will be comprised of a subset $n_1$ plus a subset $n_2$ ($n=n_1+n_2$), and a pair will be identified as one terminal from $n_1$ and one terminal from $n_2$.

The resistance reading circuitry: The n terminal points are each positioned on the surface of the rock, and they must be electrically activated in order to read the resultant resistance. For this to happen their physical address has to be extracted from the conversion matrix and be fed to the electrical activation circuitry. This circuitry is power activated to place a voltage difference between the two identified terminals. This circuitry will be equipped with a current meter (amperage), and a computation unit that will compute the resistance, $R=\Delta V/I$, where $\Delta V$ is the voltage difference across the terminal points, I is the resulting (measured) current.

The Integer Conversion Unit is the one that is fed with the raw resistance measurement, (R) and converts it to an integer ($\rho$) which serves as the output of the query. The mathematical analysis section describes the procedure for doing so. We emphasize here that the reading may be further processed through modular arithmetic to insure a random distribution between a value of zero and some max value, v. (See below).

The output control circuitry is an add-on control over the output of the query. It may be a delay control, it may be a count control, or a combination thereto. A delay control may simply delay the response to a 0.01 second or so, such that there is no adverse impact on the proper query, but it would prohibitively slow down an attempt at an exhaustive extraction of the rock's data. The counter will have the same purpose. After a preset number of queries in a short period of time, the output will freeze or delay to a minute or so before releasing the output.

Modular Rock Reading

There are several ways to define a pair of terminals over the rock. One way is to divide the n terminals to two roughly equivalent size subsets $n_1$, $n_2$ ($n=n_1+n_2$), and place the two sets such that the physical distance for every pair will be roughly the same. This happens if the terminals are placed at opposite sides of a "brick" rock. Otherwise, the pair of terminals may be formed by any random choice (i,j) from the set of n terminals. In that case the terminals may be distributed all over the rock's face, and hence there will be a significant count of pairs with physical distance shorter than the average, and a limited number of pairs of terminals with a longer distance than average. This will break the uniformity of the reading. Let the integer reading $\rho$ range from $1 \leq \rho \leq N$, then a configuration as described above will favor values closer to 1 than values closer to N. To counter that distortion, one will pick an integer $\zeta < N$, and use it to convert $\rho$ to $\rho'$: $\rho' = \rho \text{ MOD } \zeta$.

Random Rock Priming

Once a random rock is assembled, it needs to be primed. One would randomly choose some g pairs of terminals and then measure their associated resistance reading $r_i$, i=1, 2, ... g. $\{r\}_g$. For large enough g, we have $\{r\}_{g \cdot max} \to h$ and $\{r\}_{g \cdot min} \to l$, where h and l are the maximum and minimum expected resistance readings of the rock. These values (h,l) may be quite readily computed from the shape of the rock, by assuming for h that the rock is uniformly comprised of the material of the lowest conductivity, (over the most mutually distant pair of terminal points) and assuming for l that the rock is uniformly comprised of the material of the highest conductivity (over the closest pair of terminal points). These values (h,l) can be computed or measured a-priori, but for a sufficiently large g the max and min resistance values of the g measurements will be a good approximation.

A sample of the manufactured rocks will be randomly chosen, and each will be subject to the same series of measurements. These measurements will be evaluated for extraction of the error rate, based on the variance between the measurement. As shown in the mathematical analysis this error rate will be used to determine the conversion from raw resistance measurements to the integer output.

The priming process will also include temperature-sensitivity testing, measuring to what extent are the measurements affected by the temperature of the rock. These tests will lead to instructions as to the temperature interval for keeping the rock.

Disposal

When the random rock is no longer in use, it has to be disposed off in a way that would prevent an adversary from (i) acquiring the means with which to discover secrets that are still viable, and (b) study and learn our rock design philosophy in order to beat future rocks. If the comprising materials are plastic, or otherwise easy-melting materials, then heating to create terminal deformation of the rock will be attractive. The chief security officer may insist on gathering all the outstanding rocks, and disposing of them in one session.

Applications

The rock will serve as an effective supplier of shared randomness. And as such it should be useful for any situation where two or more communicating parties need to communicate securely. The rock will be able to supply an indefinite quantity of random bits, depending on the rock's capacity. When some y random bits are needed to serve a communication session between a transmitter and a recipient, according to some active protocol, then the parties may decide that one of them will randomly select terminal pairs to assemble the y random bits, or alternatively the two parties will share the load. The transmitter will pick $y_t$ bits and the recipient will pick $y_r$ bits, such that $y_t+y_r=y$. Each party will then communicate to the other the identities of the selected terminals from which to form pairs. This sharing of initiatives will pacify each party that the the selected y bits are not a replay from a former communication, as may happen by mistake or by intent on either side.

It may be advisable to use modular arithmetic in translating the raw reading r(i,j) to an integer value $\rho$(i,j). The reason is that the random selection of the pairs may net many cases of high-proximity pairs. Such pairs, statistically are likely to have low resistance readings, and hence in a regular translation of r to $\rho$, the low values of $\rho$ will be more popular, and randomness will be damaged. By mapping all the regular $\rho$ values (as discussed in the mathematical analysis section) to a value modular some value $\rho_{max}$, then the random nature of the readings is restored.

Illustration: let the regular translation of resistance reading feature 2q intervals, and let q=20. Since many high proximity terminals are more likely to have $\rho$ reading of 1 to 10, then from 30 to 40, it may be advisable to translate the regular reading to a modular 10 value. And so a resistance reading of 23, will be translated to a reading of 3, which amount to two bits '11'. Suppose the parties wish to exchange an AES key of 128 bits. In that case the string '11' will serve as the first two bits of the shared key. The rock will be measured again with a new randomly selected pair, and the resistance reading will log, say, $\rho$=39. This will translate into a reading of 9 modular 10 which will be translated to '1001', concatenated to the first string to form a bigger secret string: '111001'. We now have 6 bits, 122 more are needed and added in a similar way.

The Random Rock may also be used for unshared randomness. For example, a user of the BitFlip cipher will need a constant supply of high-grade randomness which is not pre shared with the opposite party. The rock will be a better source than algorithmic simulation of randomness. For unshared randomness there is no need to use the error tolerance and thus readily translate raw resistance reading to an integer (r→ρ). The rock has no moving parts and is quite rugged against the elements. This aspect represents a critical advantage vis-à-vis dynamic methods based on ad-hoc radiation gauging, or the new method of photon-shooting towards a half-way mirror. The rock is a means to pre-package high-quality randomness and then use it in a rugged contraption.

Hashing Verification:

Communicating parties, extracting a shared bit string from the rock, may verify the consistency of their extractions by exchanging a hash of that string. If the test fails, they would re-apply the rock extraction procedure.

Very Large Size Rocks:

The larger the rock, the greater its capacity, so a very large rock (cabinet size or larger) will have an enormous capacity for randomness, which by itself is a great security booster. But what is more—a cupboard size contraption is not something one can sneak in past security, hide in clothing etc. And since the rock cannot be completely compromised without physical access, this large size attribute may be a big security advantage, while having no disadvantage if used by an industrial size-computing center.

Ruggedness:

For an environmentally punished device needing a source of randomness, the Rock may be the best choice because it has no moving parts, and it may be used either for unshared randomness or for shared randomness.

Another, a bit more exotic use of the random rock, is in conjunction with the FigLeaf protocol.

The Random Rock and the FigLeaf Protocol

The FigLeaf protocol offers two strangers in cyber space to establish temporary privacy [Samid 2013]. The protocol refers to a large set of random data, designated as the "entropy set". The two strangers randomly pick a small subset of data from the entropy set, and then run a dialogue intended to determine whether by chance they picked the same value, which will be their secret. In the FigLeaf protocol the entropy set is exposed to the adversary, but it will work much better if the entropy set is not publicly exposed. This leads to the implementation of FigLeaf where a group of communicating parties all share the same randomness rock, and then any two parties within this group practice the FigLeaf protocol such that they establish temporary privacy against the other members of the group, and even a greater (durable) privacy against strangers who don't have possession of the rock.

Security Analysis

The first security question is: can an attacker compromise the random rock without having a possession of the device? We consider an attacker that can query the rock as many times as desired. Submitting a specific pair of terminals, and getting an integer in reply. This attack can be carried out to the 'brute force' limit, mapping all the possible answers. This attack may be counter-measured in several ways: (i) size—the random rock may be made so large, in terms of number of terminals that brute force attack will be infeasible; (ii) delayed response. The rock may be equipped with a delay option for repeat queries. (iii) the rock may be fitted with a counter that will allow normal queries, but will stop, or slow down considerably for repeated queries.

This defenses apply also towards an insider who can toy with the rock, and query it at will.

The second question is: given a finite set of queries and their answers, is it feasible for an attacker to learn about the answers for additional queries. Since the construction of the rock is driven by high quality randomness input, there is no established pattern which a smart attacker can discern, and so a finite set of queries will not become a source of compromise. If the attacker finds out somehow that a new query refers to terminals that are physically close to other pairs of terminals, (physical terminal proximity) then, there might be an inferential advantage. However, the rock is designed such that each terminal is planted in a zone of a different material than that of its neighbors, so the physical terminal proximity does not indicate read values similarity. Yet, it is helpful to keep the mapping matrix secret so that specifying terminals will not betray information regarding their physical proximity, The next security question is: can an attacker who has a temporary possession of the rock, compromise it? Such a possessor will be able to query the rock, and face the defenses identified above. Otherwise, without destroying the rock, the attacker will not be able to figure out its construction, and hence remain in the dark.

The next security question is: can an attacker who got a possession of everything relevant except the rock itself, compromise the system? The answer is yes, with respect to the deterministic design features and with respect to the randomness that created the actual rock configuration. The Rock security, then, depends on the diligence of the manufacturer to effectively hide the design and manufacturing guidance. The best way to do so is to destroy the randomness choices at least, and advisably also the deterministic design. This will prevent the manufacturer from manufacturing more rocks, but will prevent any theft, or compromise.

The next security question is: can an attacker, in possession of a rock, be able to duplicate it? It is difficult but possible. The attacker would have to 'file away' the materials layer after layer, measure the dimensions of each block, identify the material in each block, then compile all that data to be fed into a three-dimensional printer that will duplicate the rock. If the comprising materials are elemental metals their identity will be readily revealed, but if they are seeded macro molecules, then the identification will be much more difficult. The smaller the rock, and the smaller the blocks that comprise it, the more difficult will it be to accurately measure the dimensions of the constituent blocks. And one will never know if the reconstruction was sufficiently accurate to generate the same output to queries. One may note that the attacker does not have to identify the exact material used in the rock, only to identify its exact conductivity, and then find a material with same conductivity. This may not always work because of electrical tension that builds up between the adjacent surfaces of the comprising materials which may impact the reading.

It would be hard to figure out the internal construction of the rock without taking it apart (destroying it). Any x-ray or similar method may not distinguish between the various comprising materials (which may be built from macro molecules) with different seeding, to engender different conductivity.

Dynamic Randomness Rock

The randomness rock as described above may be augmented into a dynamic version in the following way. After construction, one will select random spots on the surface, and drill holes of an arbitrary diameter, at an arbitrary depth, as long as those holes don't intersect. Into each of these holes, one will slide in a disruptive rod.

A disruptive rod is defined as a rod constructed of material with conductivity at the opposite spectrum from where the comprising materials are positioned—conductivity wise. That means that if the comprising materials are semi conductors, or insulators, then the disruptive rods will be highly conductive metals. If the comprising materials will be highly-conductive metals, then the disruptive rods will be of poor conductivity.

The hole on the surface of the rock will be fitted with an exact sliding mechanism that would specify the depth to which the rod has been pushed into the drilled hole. It may span from no entry at all (the hole is fully empty, to full entry to occupy the entire hole. The state of the sliding rods in the rock will impact the reading of resistance between any two terminals on the rock.

To operate the dynamic rock, the communicating parties will agree on rod-settings in the open, and then will read the same measurements. The eavesdropper without the possession of the rock will be un-helped by the rod-setting information.

Given h holes to be drilled in the rock, where each rod can slide into its hole such that it can be stopped at s stops, then the rod setting will amount to a list of s position pairs (i,j), where i is the numeric identifier of the hole (1, 2, . . . h), and where j is the numeric identifier of the state of sliding of rod-i, where j=1, 2, . . . s. Given such h pairs the communicating parties will be able to agree on a particular setting in the set of $s^h$ settings, each with its own $n(n-1)/2$ readings. The total amount of reading associated with the dynamic random rock is:

$$s^h n(n-1)/2$$

For a rock with n=10000 terminals, h=10 rods with s=20 sliding positing each, this amounts to more than $10^{20}$ readings, Way above any possibility for post imaging of the rock.

Engineering the Dynamic Rock

There are established ways to slide a rod into a hole with great accuracy of position. The chosen method will have to be tested to insure that when different rocks have their rods in the same desired position, the resistance reading is sufficiently the same. Eventually the rod position joins the other sources of error, which in turn determines the conversion of the raw resistance reading to integer reading.

One particular method stands out: screw-track mechanism where a large span of movement of a perpendicular ring is moving the rod in a much smaller span. This increases the accuracy of the rod position.

In the extreme case the dynamic rock may be used in a binary fashion. The rod is either totally in or totally out.

The dynamic rock is more convenient to implement with a large, static contraption. For smaller implementation the rods may be too cumbersome. Also, the rods introduce a moving element while the basic rock has none.

Outlook

Randomness is envisioned to be for this century the equivalent of oil in the former century: cyber oil. And the randomness rock is a means to supply high-grade randomness at practically unlimited amounts, with the added advantage of shared values, but with the additional advantage of using it as a source of high quality randomness where sharing is not required.

Hence it is being envisioned that future computing devices will be fitted with randomness rocks as a matter of course, and where the use of this built-in randomness will be governed by a variety of applications.

Various groups, like all workers in a company will use a shared randomness rock for assorted applications. The rocks will come at various sizes, from micro sizes to brick size and beyond. Some will be used as stand alone devices and some integrated into a larger computing device. An open question to be answered is: for a given capacity, how small can the rock be?

The Rock Versus Quantum Entanglement:

The critical need to protect shared randomness has brought to bear the rise of an advanced technology, exploiting the mysterious feature of nature known as quantum entanglement, QE, in order to achieve secure sharing of randomness between two communicating partners. QE has a clear advantage: it may generate its shared security ad-hoc, so it does not linger around, ready to be compromised. However it requires the generating mechanism to be fully operational when needed. It also does not provide security per se, only detection in the event that the randomness was ill exposed. The technology is nascent, expensive and precarious, and is limited to two sharing partners. By contrast the rock builds up security ahead of time; when operational it takes low-tech to read the data, and it resists compromise the old fashion way—through physical security, which means by offering immunity to software hackers.

Random rocks are envisioned to become a staple in the 21st century cyber space.

Operational Summary of the Invention

This invention describes a system that efficiently packs indefinitely large quantities of random data in sufficiently identical physical entities ("Random Rocks", "Rocks") so that all holders of a matching Rock will extract from it the same data, in response to the same data request, ("query")— akin to the cryptographic concept of Oracle. The packed random data is inherently analog, not digital, in form; the Rock always responds with the same data to the same data request, which must be presented one request at a time.

This invention also describes a method for manufacturing a pre-determined number of duplicate physical entities ("Random Rocks", "Rocks") that serve as containers for indefinitely large amount of random data, such that when the manufacturing instructions are erased and disposed of, it is infeasible to manufacture additional duplicates. The existing duplicates don't lend themselves to reverse engineering. They cannot easily be examined without being destroyed. The data in the Rocks can be extracted one small data element at a time, resisting attempts to extract more data at a time. This serial extraction of data may be governed as to speed of data release to hinder massive copying of its content.

The system described above may be implemented in a way where the Rocks are comprised of materials of varying electrical conductivity, partially mixed according to random data, such that the electrical resistance measured between any two arbitrary selected points on the surface of the rock depends on the individual conductivity of each of the comprising materials, and on the manner of distribution of all those materials within the rock. The term partially mixed indicates no zero mixing and no perfect mixing, in each case the conductivity variance does not come to full expression. In a partial mixing there would be zone where one comprising material will be dominant, while in the next zone, another material will be dominant.

The above method can be implemented where the Rocks are manufactured in a three-dimensional printing process where the printing is carried out with materials of varying degrees of electrical conductivity, which are mixed according to instructions that are comprised of deterministic design parameters further specified with random data, thereby manifesting the printer input randomness in the manufactured Rock, extracted through random readings of electrical conductivity between two arbitrary points on the surface of the Rock. The deterministic part of the 3D printing instructions will insure high degree of variance for resistance readings through arbitrary pairs of terminal points on the rock. The randomness part will insure that those readings will be randomized. This is in a way a method to migrate high quality ad-hoc randomness generated ideally from a subatomic process, like nuclear radiation rate, into a durable piece of hardware, where it can be (i) shared, and (ii) used for the duration, by all the parties who share a good copy of the rock.

The described system may be built in such a way that the surface of the Rock is fitted with electronic circuitry that creates a desired voltage difference between two arbitrary points on the surface of the Rock, $\Delta V$, that results in a measured current I, from which the respective resistance $r=\Delta V/I$ is computed, and then converted to an integer, $\rho=floor(r/T)+1$, where floor(r/T) is the integral part of the division of r by T, where T is an arbitrary resolution interval The system can also be built so that the surface is marked with n terminal points, such that a user can specify two points i, and j, i≠j, $1 \leq i,j \leq n$, and receive in return a random integer N, $1 \leq N \leq H$, in the range 1-H, computed as $N(i,j)=\rho(i,j)$ MOD H, where $\rho(i,j)$ is computed from $r(i,j)=\Delta V/I$.

The same system as described above can be built so that the surface is marked with n terminal points that are divided to two groups, $n_1$, and $n_2$, $n=n_1+n_2$, such that a user can specify one terminal point from the first group, i, and one terminal point from the other group, j, $1 \leq i \leq n_1$, $1 \leq j \leq n_2$, and receive in return a random integer N, $1 \leq N \leq H$, in the range 1-H, computed as $N(i,j)=\rho(i,j)$ MOD H, where $\rho(i,j)$ is computed from $r(i,j)=\Delta V/I$ as described above.

Further the above described system can be built such that the Rock is divided to three-dimensional sections of pre-selected shapes, the size, orientation, and position of which is determined by random input so that each point in the Rock is associated with one section among these non-intersecting sections, and each section so geometrically defined is filled with one of the comprising materials, the selection of which is dictated by random input. The division of the rock may be through concentric entities which are then subdivided into blocks or by simulating random bodies tossed around in the rock's volume.

Further the above described system can be built with comprising materials are various metals and other good conductors. Alternatively the comprising materials may be various macromolecules induced (seeded) with graphite and/or other additives that create materials of desired conductivity, thereby establishing a desired span of conductivity among the selected materials, while avoiding a selection of materials with conductivities that are too close to each other.

As another option the above described system (the Rock) may use comprising materials are engineered through nanotechnology to establish a broad span of conductivity among the selected materials, while avoiding a selection of materials with conductivities that are too close to each other. Such rocks may be smaller in size for a similar capacity of data. As to the form of the rock we can state that among these forms there may be a brick, a polyhedron, or a ball, and also 'topological' Rocks with 'holes' in them, where all or part of the faces are covered with selected terminal points.

An additional feature of the rock is disruptive sliding rods, that may be fitted in any of various sliding positions, at various penetration depths into the rock, such that the settings of these positions affect the measured electrical resistance between any two arbitrary terminal points on the surface of the rock, and where the conductivity of the sliding rods is markedly different from the conductivity range of the comprising materials. So, for semi conductors as comprising materials, the rods will be good conductors.

From a bird's view this invention describes a method for capturing ad-hoc high-quality randomness (e.g. quantum mechanical grade randomness) in a durable compound of physical matter that can be duplicated in a limited and controlled fashion, such that by sharing the limited and well controlled duplicates of same compound, a group of communicators may use this shared randomness to achieve secure communication and other cyber space aims FigLeaf Randomized Spontaneous Security Abstract: Walking around in cyber space data naked, seeking fig leaves to cover our private affairs, we today rely on various mathematical-complexity solutions, which provide a false sense of protection. The big cryptanalytic juggernauts wish us to trust these public/private key pairs, so we hide our deepest secrets with them, which those data hunters then violate. We propose to take a different route to establish privacy in an otherwise privacy-free zone: randomized spontaneous security. Our focus is on first securing a temporary secret, that may have a short life span, but of sufficient length to either accomplish the private transaction (e.g. payment), or to enable the privacy seekers to leverage it to an enduring secret. The temporary secret is achieved by allowing the privacy seekers to each randomly select a small subset of a sufficiently larger set of data elements (the entropic set), and then exercise a dialogue that allows them to indirectly determine whether they have randomly picked a shared element. The privacy seekers will repeat this procedure until they succeed—using this shared element as their temporary secret until the "privacy killer" catches up. The shorter the required life span of the temporary privacy, the easier and faster the computation. The protocol may be exercised with only basic computing power, which offers implementation flexibility. The reference set used in the FigLeaf protocol may be a set of mathematical construct, a designated data base, or a physical set.

1.0 Introduction

What is the Weakness of the Current Approach?

It relies on unproven algorithmic intractability. And since there is no mathematical proof that the deployed algorithm is useful for its declared purpose, the reliance shifts to the next-best-thing: preponderance of evidence. The fact that an ever-larger number of attempts to pierce the conjectured intractability, have all failed is a "strong indication" that this intractability is effective. Mathematicians abhor such logic, pointing to countless counter examples, like the Mersenne conjecture for primes of the form $2^n-1$. Yet, absence of proof, we all surrender to relying on that preponderance of evidence. And this reliance creates a gravitation process, where all users choose the one or few algorithms, which are most popular, since they have attracted more attackers, (without a published success), and hence are protected by more preponderance of evidence. This popularity of very few algorithms creates very valuable stationary targets for cryptographic adversaries: they have one or few algorithms to crack, and a strong incentive to hide the state of progress in cracking those few very popular algorithms. As a result the user community operates under the shadow of suspicion that some cryptographic adversaries have already cracked the algorithms we use and assume intractable, and they exploit this feat with sufficient caution to deny any strong evidence that this is the case.

To remedy this vulnerability we may want to opt for mounting intractability through ad-hoc, random ingredients. Such intractability will deny any crypto adversary the option to dig, research and prepare for attack beforehand.

2.0 Entropic Advantage: A Theoretical Framework for Privacy and Security in a Hostile Environment We concern ourselves with the following challenge: two or more parties with no shared communication history of record wish to establish a shared secret through a communication protocol that is carried out in complete visibility towards the party against which the secret is desired.

We designate the parties that wish to establish a mutual secret as the "privacy seekers" or PS, and the party against which the secret is being established as the "privacy killer", or PK.

We propose for the PS to establish a visible set of s elements, such that each element is associated with a data item. We designate this set as the "Entropy Set" (ES). The PS will wish to designate one element in the ES as their shared secret. To that end the PS will operate on the ES, communicate about their operation for the purpose of creating an entropic advantage against the privacy killer.

We define "entropic advantage" in this context as follows: At any moment in time, t, each party assumes an entropy measurement of the question: which of the s elements in ES is the secret shared by the privacy-seekers (PS), if any?

$$H_x(t) = -\sum_{i=1}^{s} p_{ix}(t) \log(p_{ix}(t))$$

were $p_{ix}(t)$ is the probability rating held by party x at time t, that item i in ES is the shared secret.

We define the entropy of the PS: $H_{ps}(t)$ as the sum of the entropies of all the privacy seekers at time t. Accordingly, the entropy advantage experienced by the PS over the PK, EA(t), at time t is defined as:

$$EA(t) = \frac{H_{pk}(t) + 1}{H_{ps}(t) + 1} - 1$$

Where $H_{pk}(t)$ is the entropy of the privacy killer with the respect to the same question. It is easy to see that should the PS determine at time t, with certainty that one element in ES is their shared secret then $EA(t)=H_{pk}(t)$, and in the case where: $H_{pk}(t)=H_{ps}(t)$, EA(t)=0. As soon as the ES is defined, (t=0), we have:

$$H_{pk}(t=0)=H_{ps}(t=0)=\log(s)$$

For the PS to secure their desired secret at some time point $t_s$ they will have to reach a point of time $t_s$ characterized by:

$$H_{ps}(t=t_s)=0 \text{ and } H_{pk}(t=t_s)>0.$$

Hence to achieve their desired objective the PS will have to devise a communication protocol resulting in entropy decline for the PS in a greater pace then it would decline for the PK. In other words, to secure their shared secret the PS will have to achieve an entropic advantage defined as:

$$H_{ps}(t)<H_{pk}(t) \text{ for some values of } t\colon 0 \leq t \leq t_s$$

We now concern ourselves with the challenge to effect an entropic advantage for the PS over the PK. Since the entropy reduction protocol is carried out in complete visibility towards PK, it is a natural question to ask: is it theoretically possible?

Since all the information that flows from anyone to anyone is visible to everyone, the only way to build a discriminatory entropy is to maintain a discriminatory knowledge of relevance. At the instant when the ES is defined, all parties have equal knowledge of it, and share the entropy measure $$H_{ES} = -\sum_{ES} \frac{1}{s}\log\left(\frac{1}{s}\right) = \log(s).$$

There is a way for players to carve out an entropic distinction, and that is by taking actions and not communicating them, at least not directly. Such action is to randomly pick a subset of the ES. Each player so picking will have its own picks, over which each player can communicate, and owing to this communication achieve a unique measure of $H_{ES}$. Once so, it is theoretically possible for the PS to achieve a temporary entropic advantage at some point, over the PK. And that is because of what the PS know, and the PK knows not, and hence their entropic measure with respect to the possibility of each element in ES being a shared PS secret is different for the PK versus the PS. Note that this conclusion is independent of the computing power of the parties.

This answer leads directly to a second question: can the PS secure a permanent entropic advantage? In other words, can the PS achieve a zero entropy state for themselves, while insuring some residual non zero positive entropy for the PK?

Here we offer a conjecture that a permanent entropic advantage is impossible. We will prove it ahead with respect to a particular algorithm discussed here: the FigLeaf solution. Yet, the general question remains open.

Any temporary entropic advantage may be extended indefinitely. A temporary secret may be used to encrypt data for another round of the same procedure, and the new secret may be used for yet another round. And so ad-infinitum. The PK will keep chasing the latest PS secret, but the PS will have to keep "pumping" to maintain the secrecy state.

Concluding that an entropic advantage is always possible, but that it is always temporary, one is confronted by the third natural question: duration. How long can an entropic advantage last?

The answer to this question clearly depends on the computing power of the parties involved, so it may be extremely short, or quite long or any measure in between.

The fourth question that comes forth is: how long is long enough?

The answer depends on the purpose for which the privacy is sought for. For certain purposes a very short interval of privacy is sufficient, for others the temporary privacy will have to be leveraged to secure a permanent privacy and security.

The following graph depicts the entropic advantage process in its generic form. Ahead, we will discuss a particular protocol to implement it: the FigLeaf Protocol.

3.0 The FigLeaf Protocol

The FigLeaf protocol proposes to achieve an entropic advantage by calling for all the privacy seekers to randomly pick a subset of the entropic set, (a "pick list"), and then communicate among themselves for the purpose of ascertaining whether by chance they all have one element of the ES in common, within their respective pick lists. And if they do, regard this element as their temporary shared secret, and if they don't, to return to the former step where each PS picks a random subset of the ES. Each PS knows which elements it picked and that internal knowledge discriminates between the PS parties and the PK. It is this discrimination that is the basis of the efficacy of the FigLeaf protocol.

The key to the FigLeaf protocol is the challenge for the PS to communicate to each other information regarding the elements they randomly picked (their pick-list) such that they will be able to mutually shrink their ES entropy, faster than the PK. The way the FigLeaf protocol proposes to do it is to take advantage of the fact that every physical element (in case the ES is physical), and every abstract element (in case the ES is abstract) may be characterized by infinite number of properties: $p_1, p_2, \ldots \infty$. where each property j comes with a respective range of possible values $r_j$. Each element i ($1 \leq i \leq s$) in the ES may be associated with any number t of properties. Let $v_{ij}$ specify the value of property j for $1 \leq j \leq t$ associated with element i ($1 \leq i \leq s$).

The selected properties must be 'readily computable'. Let $d_i$ be the data associated with element $i \in ES$, then the computation: $d_i \rightarrow v_{ij}$ to compute the value of property j for element i, will be sufficiently fast, not to choke the procedure with overbearing computation. The function that performs this computation should be a "weak one way function" (WOWF): a function for which the pre-image requires substantially more computation than the pass forward. While a regular one-way function (OWF) requires infeasibility of reverse computation, a WOWF will only require that the computational burden backwards is considerably greater than the computational burden forward. The FigLeaf protocol just has to insure that direct computation of pre-image is more difficult then scouring the ES for it. There is obvious less doubt as to the existence of WOWF than to proper OWF. Anyway, it is a fundamental requirement of the FigLeaf protocol that WOWF do exist, and that there are plenty of them.

The fundamental lemma of the FigLeaf protocol: for $i \neq j$, two elements $T_i, T_j \in ES$, there exists a property $p_t$ such that $v_{it} \neq v_{jt}$.

Proof: Any two distinct elements, which share the values of all their properties cannot be established as distinct one from the other. Hence, if they are known as distinct they must have at least one property t for which $v_{it} \neq v_{jt}$.

Let X and Y be two elements of ES (X, Y∈ES). Let X and Y share the values of t properties: $v_{xi} = v_{yi}$ for i=1, 2, . . . t. We can write then:

$Pr[X=Y]$ 1 for $t \to \infty$.

Namely, the more properties the elements have in common, the greater the chance for these elements to be one and the same. We regard this as the statistical determination of identity.

We can also state the obvious: if there exists a property $p_k$ such that $v_{xk} \neq v_{yk}$, then $X \neq Y$. Based on the above two premises, two PS, each holding a randomly picked element of ES will be able to steadily decrease the entropy over the question of whether they hold the same element, by comparing the values of more and more properties of their respective elements. This is called the property-based entropy reduction process.

In the case where the two PS hold the same element in ES, then, no matter how many properties they will compare values for, there will be not a single disagreement.

Based on the above premises we can state the following: Alice and Bob, two privacy seekers, randomly pick an element form the ES, elements A and B respectively. Alice and Bob then select t properties shared by all elements in the ES, and compare $v_{ai}=? v_{bi}$ for i=1, 2, . . . t. Applying the statistical determination of identity, Alice and Bob will increase their confidence in the proposition that they both hold the same element (A=B) as the value of t increases.

Since the PS determine the ES, and they also determine the properties they evaluate, they are fully aware of the size of ES, (s), as well as the range of values $r_i$ associated with every property $p_i$. Alice and Bob will further restrict themselves to properties, which are uniformly distributed. Hence the probability for any arbitrary value of property i for element j is $1/r_i$, for all combinations of i=1, 2, . . . t and j=1, 2, . . . s. This restriction will allow Alice and Bob to compute the likelihood for both of them to hold the same element (namely A=B) as:

$$Pr[A=B] = 1 - \prod_{i=1}^{t} \frac{1}{r_i}$$

As Alice and Bob check more and more properties they eventually reach a point (a t value) where they are both sufficiently convinced that they hold the same element in ES. Since the ranges of the selected properties is known to the PK, it too will be able to compute the chance of Pr[A=B] and be equally convinced of the proposition that Alice and Bob hold the same element.

The critical difference between the PS and the PK is that the PS know the identity of the element they each hold, while the PK does not. This holds for the moment where the probability of Pr[A=B] reached the convincing level. And it is that gap in knowledge that is the foundation of the FigLeaf protocol.

The Temporary Entropic Advantage Theorem: the knowledge advantage established for any PS over the PK is temporary. Given the values of the t properties which convinced the PS that they hold the same element, the PK will eventually be able to check all the elements in the ES, and find the identity of the shared element with the very same degree of confidence that served the PS.

Proof. Suppose the PK checks the ES and concludes that there are two elements X, and Y that are associated with the values of the t properties checked by the PS. Namely: $v_{xi}=v_{yi}=v_{ai}=v_{bi}$ for every property i=1, 2, . . . t. The PK will then end up with terminal equivocation over the identity of the shared element held by the PS. However, in that case the PS will also have to wonder: perhaps X=A≠B=Y? Since both Alice and Bob pick their element randomly, there is an equal chance for the following possibilities: [A=X, B=X], [A=X, B=Y], [A=Y, B=Y], [A=Y, B=X]. Which means that there is 50% chance that Alice and Bob do not hold the same element. And hence, given that Alice and Bob are statistically sure that A=B, it is necessary that X=Y, which means that when the PK finishes checking the entire ES, it too will know, and with the same confidence, the identity of the shared element held by Alice and Bob. In other words—no residual entropy can be planned using the FigLeaf protocol.

What is possible, though, is to modify this basic practice in order to increase the interval of privacy (IoP) which is the time interval between the moment when the PS identify their mutual secret, and the point when the PK catches up.

We shall limit our discussion to two privacy seekers, since any larger group can eventually share a secret by repeat invocation of the bilateral secret sharing.

We choose to introduce the approach and the methodology by first presenting a simple configuration, and later building upon it.

4.0 The Basic Entropic FigLeaf Configuration

The privacy seekers plan to exercise a procedure which will give them an entropic advantage over a privacy-killer who is exposed to anything the privacy seekers are sending each other. The Privacy seekers then decide to each randomly pick an element from the Entropic Set, (ES), then communicate with each other for the purpose of determining whether or not they have picked by chance the same element in the ES. We designate this exchange as the match dialogue. The match dialogue will not explicitly identify the items each of the privacy seekers selected. When the match dialogue is concluded the privacy seekers have realized whether or not they picked the same item in the ES. If they did, the procedure is over. The privacy seekers share a secret—the identity or the data content, of the mutually picked element, and that information is a secret that eludes the privacy killer for some period of time. We say then that the privacy seekers have secured their privacy, albeit for a short time until the privacy killer will catch up. If the match dialogue concludes with the determination that the privacy seekers have not picked the same element then, they will each pick out another element in the ES, again randomly, and so continue until they randomly pick the same element.

We can write:

$$FL(ES) \to d$$

where FL is the entropic figleaves procedure, operating on the ES to generate a shared secret, d, for the privacy seekers.

Since the PS cannot explicitly identify the picked element without undermining their purpose, they need to refer to it and communicate its identity based on some derived property. Let p be a property of each of the s elements in the ES. Let the range of possible values for p be r. Let the value of p for elements in the ES be a uniform distribution, i.e: the probability for the value of p to be an arbitrary value p=v, be 1/r for every element s in S, for every v in the r range. The property p is computed from the value, v of the picked element, d, of the ES via a dedicated weak one-way function, so that the privacy killer will face a computation effort requiring $\theta_b$ time units to reverse compute p d, and $\theta_b$ is sufficiently large.

The following is clear with regard to the collision probability—the probability for two elements in S to share the same value of p:

$$Pr_{collision}[s/r \to 0] = 0$$

where $Pr_{collision}$ is the probability that S will have two or more elements sharing the same value for property p.

We shall now calculate the effort to achieve a match. It will be based on the expected number of random-picks, Exp(# of trials). It is by definition the summation of all the possible number of trials, each multiplied by its chance to happen.

Let $PS_1$ made it choice, X. The chance for $PS_2$ to hit on X after i trials is:

$$Pr[\text{hit at trial } i] = \left(\frac{s-1}{s}\right)^{(i-1)} * \frac{1}{s}$$

And hence:

$$\text{Exp(\# of trials)} = \sum_{i=1}^{\infty} i * \left(\frac{s-1}{s}\right)^{(i-1)} * \frac{1}{s}$$

We can multiply this equation by (s−1)/s:

$$\frac{s-1}{s}\text{Exp(\# of trials)} = \sum_{i=1}^{\infty} i\left(\frac{s-1}{s}\right)^{i} * \frac{1}{s}$$

Subtracting the former equation from the latter, generates a geometric series which evaluates to Exp(# of trials)=s.

Let $\theta$ be the time needed for the privacy seekers to each evaluate the value of property p of a picked element in S. Then the time needed for the privacy seekers to find a match in S will be: $\theta$s.

Let $\alpha$ be the computational advantage the privacy killer has over the privacy seekers. That means that the privacy killer requires $\alpha\theta$ time units to compute the value of a property $\rho$ of an element in S.

On average the privacy-killer (PK) will need to evaluate the value of p for s/2 elements in S, spending on average $\alpha\theta$s/2 time units to do so. On the successful match the privacy seekers (PS) spend $1\theta$ to determine the match, so on a match situation the PS secure an interval of privacy (IoP):

$$\text{IoP} = \alpha\theta s/2 - \theta = \theta(\alpha s/2 - 1)$$

Two out of the variables in the IoP equation are under the control of the privacy seekers: they can choose a property p to fit into a desired $\theta$ value, and choose the size of S (=s) at will. IoP is the time available for the PS to either accomplish the objective for which they have sought privacy, or to exercise a leveraging procedure to leverage the IoP to a more extended privacy.

While the PS may completely control the IoP, and make it as large as desired, the cost for doing so may be prohibitive. Since the expected number of trials before a match is s, then the time spent on the procedure will be, on average PET=$\theta$s, PET="Procedure Execution Time". If the PS and the PK have comparable computing power (namely $\alpha$=1) then PET is roughly double the IoP: PET=2*IOP ($\alpha$=1). So, if the PS require an interval of privacy of 10 minutes, they will have to invest 20 minutes in carrying out their procedure. For certain applications (like money transaction) the required IoP may be very short, say 5 seconds, and in that case the entropic advantage procedure will take a reasonable 10 seconds.

For this procedure to work, it is necessary to use either a new ES, or a new set of properties (or both) each time it is initiated, otherwise the PK will evaluate S with p before the procedure is carried out, and the IoP will shrink below its efficacy levels.

4.1 Illustration

Let us define an entropic set, ES, comprised of s elements, as the number from a starting value L, to a final value H=L+s. The identity (label) of each element is the same as its content: its value, v (L≤d≤H). We can define a family of useful properties as follows: A selected property p will be structured:

$$v = d^{g+1} \text{ MOD } r$$

where v is the value of property p for element of value d, r is the range of values for p: 0≤v≤r, and g can be defined ad-hoc as the number of prime numbers that serve as factors for v, and are found within the interval $L_p$ and $H_p$ (two integers). The values of $L_p$ and $H_p$ determines the value of θ, the computation time for a given v. r can be set so that: s<<r. Checking out with a set of numbers: let s=1000, L=6000, H=7000, r=50000, $L_p$=10 and $H_p$=20. Let θ=500 milisec.

Alice, one of the privacy seekers randomly selects a number between {6000:7000}:d=6721. She computes its factors: 6721=11*13*223. She counts two factors between 10:20, so she computes p as:

$$v(d=6721)=6721^3 \text{ MOD } 50000=43361$$

Alice communicates v to Bob, her privacy-seeking companion, and if he computes the same v value, they assume they have by chance selected the same number. Otherwise they both try again and again until they randomly pick the same number as indicated by the value of the property p. The expected number of tries is s=1000, so the privacy seekers are expected to spend 1000*500=500 sec. Assuming α=0.1 they will secure an interval of privacy (IoP=0.5*500*0.1-1=24 seconds. The privacy seekers using this basic protocol will secure 24 seconds of privacy at the cost of 500 seconds of exercising the FigLeaf procedure. Not a very appealing prospect. But help is on the way.

5.0 The "Birthday" Version of the Entropic FigLeaf Procedure

Considering a comparison with the prevailing algorithmic-complexity solutions the FigLeaf solution suffers from a practical shortcoming—the very long and burdensome effort to practice it for an ES of size s that is large enough to offer a useful interval of privacy (IoP). This focuses the innovation effort on shrinking the procedure execution time (PET). The idea: to let the privacy seekers, select more than one element in S, and then carry out a match determination procedure to determine if the two or more sets of randomly picked items by the privacy seekers will include a match.

This idea is especially attractive because of the well-known "birthday effect"—the unintuitive result that the chances for a match increase very fast as the size of the picked sets (the "pick lists") is increasing, even a little. And for larger entropy sets, the ratio between the picked elements to the size of the ES, is getting smaller fast, while maintaining the same chance for a math.

Given a set ES comprised of s items, and allowing Alice to secretly and randomly pick $n_a$ items from S, while allowing Bob to pick $n_b$ items from the same ES, also secretly and randomly, then the chance for Alice and Bob to have at least one matching pick is given by:

$$Pr[\text{match} = \text{yes}] = 1 - \frac{(s-n_a)!(s-n_b)!}{(s-n_a-n_b)!s!}$$

The formula is built as follows: let Alice pick her $n_a$ elements in S. Bob will then pick his first element. The chance for his pick, not to coincide with any of Alice's picks is: $(s-n_a)/s$. Bob will then pick his second choice out of a field of s−1 elements, and the chance for his second pick not to coincide with any of Alice's picks is: $(s-n_a-1)/(s-1)$, and similarly for Bob's i-th pick: $(s-n_a-i+1)/(s-i+1)$. The chance for not hitting an Alice pick by any of Bob's $n_b$ picks is the multiplication of the individual chances, and the chance for a match is the complement to one of the chance not to match.

The results are counter intuitive. For |ES|=s=1,000,000 and for $n_a=n_b=n$ we have: The results indicate that picking each 1000 elements out of a set of 1,000,000 elements the privacy seekers will have a 63% chance to have a match. Which means that on 1.58 tries on average, they will have a match.

The task ahead is for the PS to determine (i) do they have a match? and (ii) what is it?

5.1 Match Determination Procedure

The easy case is $n_a=n_b=1$: We consider weak one way function (WOWF) associated with a large range of uniformly distributed values, $r_0$ in count, computing a property $p_0$. For an entropic set, ES, counting s element where s<<$r_0$, the PS will be quite sure that if their picked element has the same property value then they have their match. The PK will be equally certain that a match was found, but unlike the PS, the PK will have no knowledge as to which element it is; and will have to test, on average, s/2 elements. And that is why this procedure is guaranteed to offer its users a certain Interval of Privacy (IoP).

We now consider the case of $n_a=n_b>1$. By selecting s<<$r_0$ as before, the PS will be sure that if they have a match for the value of some property, then they have the right element match. The problem for n>1 is to know which of the candidates is the match. The PS may resolve this question, by each picking a different OWF and disclosing the corresponding property values. Regardless of the value of n, there is likely only one match, and each PS will be in the know about it; leaving the PK in the dark—for a while. There are some 'tricks' that can be applied by the PS to boost the interval of privacy. For example: the PS may decide to run the procedure some k times. And then take the match candidate of the last round where a match was found. If no match is found in k round, then another set of k rounds is tried. The PK will not know which of the k applications of the FigLeaf procedure harvested the applied match. So the PK will have to try them all. And for all the failed rounds the PK will have to test the full s elements in ES. Hence, while the PS increased its workload k times, the IoP was increased 2k times. We now consider a series of t WOWFs associated with ranges: $r_1, r_2, \ldots r_t$, such that $r_i$<s for i=1, 2, … t. Each $r_i$ represents the value range for property $p_i$.

Let:

$$\prod_{i=1}^{i=t} r_i = r_0$$

Accordingly, an element of ES that features a particular list of values for some t properties: $p_1, p_2, \ldots p_t$, will appear with the same frequency as an element featured with a specific value for property $p_0$ which has a range of $r_0$.

This is because a random element in ES with a designated property for $p_i$ will appear in a frequency of $1/r_i$. And an element which satisfies particular values for $p_1, p_2, \ldots p_t$ will appear in frequency: $Pr[p_1, p_2, \ldots p_t]=\pi(1/r_i)$ for i=1 to i=t, which is equal to $1/r_0$.

This gives the privacy seekers the flexibility to gradually reduce the candidates' list by applying high frequency properties (properties with low range) one by one, monitor how effective they are in decreasing the number of match candidates.

To illustrate: let the entropy set ES be comprised of s=1,000,000 elements. Let Alice and Bob, the privacy seekers, each pick n=$n_a$=$n_b$=1000 elements. Their chance to include a match is 63% so that in less than two attempts, on average, they will net a match. Using a series of OWFs with small result ranges, Alice sifted out 900 elements from the original 1000 (remaining with 100 candidates), and Bob shook off 910 elements, resulting with 90 members in his match candidates' list. The PS will now analyze their remaining candidates with a $OWF^h$ resulting in range $r_h$. The OWF is selected to require a forward computational burden of 0.5 sec per element. Bob will be spending 0.5*90=45 seconds on analyzing his candidate list, and Alice will spend a little less. The PK will have to evaluate ES for the low-range properties, resulting in a similar proportion, namely 100,000 candidates. Each of which will have to be evaluated with the 'hard to compute' $WOF^r$: 100,000*0.5=50,000 second, almost 13.9 hours to analyze the situation to exhaustion, (assuming α=1).

This illustration highlights the advantage of sorting out the candidate list via a series of distinct WOWF, such that when the list of candidates is getting smaller the PS may opt for OWF which are tedious to compute forward ("Zero Way Functions"—ZWF) to increase the efficacy of the FigLeaf protocol.

The privacy seekers are in control of the entropy set, their pick-list, and the properties, and the one way functions they use. This provides a wealth of parameters that should be optimized according to the specific needs of the privacy seekers.

5.2 "Taking Turns" Protocol

Alice and Bob, the privacy seekers, may take turns in choosing properties, and the OWF that evaluate them. Alice may choose her first OWF, computing the value of property $p_1$, with range $r_1$, and sending these values off to Bob. Bob will then eliminate the elements in his pick-list for which the value of property $p_1$ is not in Alice's list. This will allow Bob to decrease his match-candidate list from $n=n_b$ to $n_{b1}$.

Since $n_{b1}<n=n_a$, it will be more effective to let Bob pick the next OWF, to compute the second property $p_2$, and then send over to Alice all the values of this property in his list. This will allow Alice to eliminate all the items in her pick-list for which the value of $p_2$ is not in Bob's list. As a result Alice's match candidate list will shrink from from $n=n_a$ to $n_{a2}$.

At this point the situation between Alice and Bob is the same as it was to begin with (after they both made their picks), except their respective candidate's list is smaller. For Alice it was $n>n_{a2}$, and for Bob $n>n_{b1}$. Another difference is that the two used OWF cannot be used again.

Alice will choose a third OWF ($OWF^3$), to compute property $p_3$ for its match-candidate list, and pass the list to Bob. Bob will then be able to eliminate any of his candidates for which the value of $p_3$ is not in Alice's list. Bob candidate list will then shrink: $n_{b1}$ $n_{b3}$. It would now be Bob's turn to pick a 4th OWF, $OWF^4$, compute the values of the corresponding $p_4$ for all its candidates, and send the list to Alice. Alice will then eliminate from her candidate-match list all the items for which the value of $p_4$ does not show in Bob's list. Her list will then shrink.

This back and forth protocol will continue until either one of the PS ends up with an empty candidate list, or with a single candidate. In the former case, the two pick-lists do not have a match, and the FigLeaf procedure needs to be played again. In the latter case the remaining candidate is the likely shared candidate.

Alice and Bob will be able to verify their shared element of ES by either one of them picking a "verification property", $p_v$, with a very large uniform range $r_v \gg s$. A match for the value of $p_v$ will verify the candidate.

While this will surely work, it will also leak to the PK that the match is the pre-image of $p_v$. It is therefore that the verification OWF should be especially strong, and even, a so called, "Zero Way Function"—namely a function that poses an intractable challenge for reverse computing, but also poses a considerable computational challenge for the forward computing. The PS have to compute one instance of the verification function, so it would not be to foreboding for the computation to be heavy. By contrast, the PK will have to go through the remaining candidates in the entropic set.

The PS may choose the various OWF per their forward computational load, in proportion to the current size of their candidates-list. When the list is large (close to the original pick-list), the computational burden to compute the properties should be small, because the PS need to compute many instances. As the candidate-list shrinks, the computational load of the chosen OWF may increase because there are fewer instances to go through. The PS may take note that the greater the forward computational load of a OWF, the greater the secured interval of privacy.

The range of the OWFs may be $2 \leq r < \infty$. The choice of r=2 is not practical because the candidate list will likely include both values. For a sufficiently large range, one OWF will identify the match, if there is one, and determine that there is none, if that is the case. We have seen that a single large range OWF may be replaced by a series of low-range OWF, allowing the PS the flexibility to choose OWF of different forward and backward computational burden.

Normally the size of the pick-lists for the two privacy seekers will be the same. However in the case where there is a great difference in computing capacity between the parties then the stronger party may use a larger pick list than its counterpart.

6.0 Use

First let's identify non-use cases. ecommerce today relies on algorithmic-complexity protocols to establish a private communication channel between two strangers in cyber space. These algorithms, as discussed, may have been secretly compromised. However, it is not likely that common financial fraudsters would know about it, without this becoming public knowledge. That means that small online purchases are OK with the current solutions. However, when the threat comes from a nation-state, or a large sophisticated organization then the FigLeaf solution rises to become a viable secure alternative.

Unlike the algorithmic-complexity solutions, the FigLeaf privacy solution is flexible as to its burden: the choice of the relevant parameters is flexible, and so is the computational load. This gives its user the flexibility to apply it with extreme security (but with more effort to practice it), or with minimal security, for which there are numerous use cases. The fact that FigLeaf is exercised with choice of OWF, allows its user to practice it with functions that do not require complex computations. The FigLeaf requirements of the selected OWF is uniformity, range specificity, and a threshold burden for reverse computation. There are plenty of simple functions that comply. This makes the FigLeaf protocol attractive for the Internet of Things (IoT) where the devices may be operating with simplified computing power.

6.1 The Randomness Fountain

A standard trusted way for privacy seekers to leverage their temporary privacy into a permanent one is to use a 'fountain of randomness'.

A fountain of randomness is a globally accessible source of high quality randomness flowing at a pace that allows two privacy seekers to use a temporary secret to both read the same chunk of randomness off the fountain, while disallowing the privacy killer who comes later from reading the same chunk. This will happen if the fountain will offer accessible randomness at various changing rates, and at such large quantities that it would be infeasible for anyone, including the fountain operator, to keep a searchable memory of past randomness displayed by the fountain. This will allow the privacy seekers to use their temporary secret to identify a common location in the randomness field, so they both read the same randomness—to become their permanent address. That shared randomness will be erased and replaced several times before the respective privacy killer finds out where to look.

The challenge of leveraging a temporary secret to a permanent one may be satisfactorily addressed by having one privacy-seeker create a random sequence content in a random network address simultaneously with establishing (or shortly before) the temporary secret is secured. No sooner does the second privacy seeker signal that it accessed that address and copied its random content, does the first privacy seeker erase that content, which will now serve as the permanent secret serving the two privacy seekers.

6.2 Exploiting Pre-Shared Bits

Quantum entanglement technology comes 'knocking'. The challenge of keeping entangled sub-atomic particles coherent is gradually being negotiated. It is becoming a reasonable expectation that privacy seekers will be able to receive entangled particles from a third party, or from either party, such that they will have a shared secret unknown to the privacy killer. The number of such shared bits of private information may be too small. So any such shared bits can be interwoven to the FigLeaf protocol—enhance it at any level of shared secret bits.

The simple way to interject entangled bits into FigLeaf is to cut the ES to a smaller set of size $ES/2^q$, where q is the number of shared qubits. This shrinking of the ES will only be known to the privacy-seekers, and not to the privacy killer. The impact will be that either the pick-list will be smaller, or the chances for a match will be greater. In either case the FigLeaf procedure will become faster. Fort example, let $|ES|=s=100,000,000$. The regular FigLeaf procedure use with $n_a=n_b=10,000$ would have a 63% chance to have a match. Applied with one shared qubit, the size of ES will be 50,000,000 for the PS, and the chance for a match will rise to 86%. With 2 qubits to share, the effective size of the ES will drop to 25,000,000, and the chance for a match will rise to 98%.

6.3 Physical FigLeaf Implementation

The ES may be a collection of mathematical constructs, but it may also be a collection of physical elements. Each physical element may be associated with any number of properties, for which well-defined measurements do exist. Such properties may be associated with a well-defined value range, and a well known degree of effort to carry measure them. That is all that is needed for a physical implementation of the FigLeaf procedure. The PS will be both equipped with a matching FigLeaf contraption, choose measurements in random, and exchange measurement results in order to zero in on a shared secret. The great advantage of the physical FigLeaf is that only holders of the physical device can crack it. And if the device requires advanced manufacturing capability then the circle of threat may be quite limited.

We discuss physical FigLeaf options:
Electro Magnetic FigLeafs
Electro Magnetic Thermodynamic FigLeafs
Chemical Electro Magnetic Thermodynamic FigLeafs The ES may be comprised of a large assembly of distinct combinations of composite materials, in the semiconductor range. The OWF will be a particular electro magnetic impact on a particular material combination, and the property will be the measured electro magnetic result. One possibility relates to the Compton effect: allowing a particular pattern of incident radiation to impact a combination (an ES element), where the scattered radiation will be evaluated as the property of the element. Incident radiation can vary in frequency, intensity and direction ranges, to make it unpredictable. Thermodynamics may be involved by measuring the temperature change of an ES element, in response to a particular current, also ranging in frequency, intensity, and duration. Different composite materials have different heat capacity and different conductivity resulting in a unique thermodynamic response.

Electro magnetically induced chemical changes can also be instantly measured. Such would apply to impact over molecular structure, molecular folding and interleaving, etc. To use a physical FigLeaf device, it would be necessary to manufacture it efficiently, make copies of the device accessible to any pair of privacy seekers, and insure that the privacy killer cannot defeat the physical protocol by carefully studying it beforehand. It is also necessary for the PK to be prevented from running the measurement simultaneously on the entire ES.

The new technology of 3D printing can be used to transfer physical ES designs between parties.

6.4 IoT Implementation

Internet of Things devices are often equipped with limited computational capacity, and cannot form a private channel using algorithmic complexity. The FigLeaf protocol may be a viable alternative. In many cases large ensembles of mutually alien IoT devices require dynamic communication, often over a short span of time. Such cases can be served by a carefully designed FigLeaf configuration, supported by a reliable mechanism to leverage the temporary secret to a permanent one.

6.5 Identity Verification

Identity theft is the fastest growing crime in the US. Today's identities are fixed data elements which are compromised in many ingenious ways. One potential remedy is to shift to dynamic identities. Let Alice and Bob be two cyber space strangers involved in some interaction. This interaction instantly turns to be an element in the cyber history of both Alice and Bob. So when Alice tries to prove her identity to Carla she indicates her transaction with Bob. Carla can then query Bob to verify Alice's claim.

In a community of players it would be possible to keep track of activities and hence identities by establishing a System Tracker (ST). The ST will designate an entropic set, and perhaps even a list of OWF. When two players interact, they exercise the FigLeaf protocol, and create a shared temporary secret. They both register that secret with the System Tracker and link it to reporting their encounter. It would be useless for a privacy-killer to extract the temporary secret, because once it has been registered, it cannot be re-registered, and will expose anyone trying to register it, as a fraud.

6.6 Timing and Scalability

The FigLeaf protocol is highly scalable. The level of computational work needed is directly proportional to the required interval of privacy, IoP. Financial transactions may require very short IoP, a few seconds, and the respective extraction of the temporary secret may require one or few seconds too. Same for environments where a community of parties randomly need to establish secure channels. Such a community could be served by a readily accessible 'fountain of randomness' (FoR), so that even a short-lived temporary secret can be securely replaced by a permanent secret.

On the other end, critical connection that face an unknown adversary, may need to be established with the assumption that the computational power of the attacker is greater than would be normally suspected. And the more one allows for adversarial assailment power, the more work will be required by the FigLeaf procedure. Transfer of critical data that would be a high prize to an adversary may be handled with a FigLeaf version that may last several minutes before it concludes.

6.7 Internal Secure Channel

A protected cyber community may also require the benefit of a private channel, and will readily use the FigLeaf procedure. Let there be m players who all share a cryptographic key, k, with which they communicate among themselves, protected from the outside. Yet, two or more players in the community may wish to establish a secure channel, not visible to the others. These parties then will use their shared keys to encrypt an entropic set, and respective OWFs, and practice over it. Other members of the community will be able to read the ES and watch the OWFs but will not be able to pierce the bilateral secret established by the two privacy seekers. Outsiders, will not be able to read the ES, on account of not holding the shared community key, k, and will be further removed from cracking the secret.

Alternatively, the community will all use a password protected randomness fountain to build the ES from.

If a community is organized in hierarchies, then the same private channel procedure may be exercised at each level.

6.8 Secondary Security

Two well-acquainted parties sharing a secret, k, may use this secret to encrypt a FigLeaf setup, and practice it. They will then be protected against adversaries who got a hold of k, and double protected against adversaries unaware of k.

7.0 FigTree: Multi Party Privacy

The FigLeaf protocol may be readily extended to three or more parties. There are several configurations. We discuss three: (i) shared multi party privacy, (ii) bilateral privacy in a multi party setting, and (iii) Group-to-Group privacy.

7.1 Shared Multi-Party Privacy

We consider t privacy seekers: $PS_1, PS_2, \ldots PS_t$ who wish to share a private secret. They may use the FigLeaf procedure with a slight modification. Every PS is selecting $n_i$ elements in the ES, and each in turn chooses a previously unused property and its matching OWF, announcing the values of its selection to all other PS. The other players mark off candidates in their candidates list, just as in the bilateral version. The challenge this time is much more daunting, all t PS will have to have selected one shared element. If they did, then the process of announcing values of properties one by one will eventually flash out that shared element, (although much slower) and the group of privacy seekers will be able to share a temporary secret.

The chance calculus, though, is quite discouraging. Let element X be a shared item for $PS_1$ and $PS_2$. Let Pr[Match=1,2] be the chance for it to happen. $PS_3$ will have a probability of $((s-1)/s)^n$ not to match X with any of its n element choice, which translates into a chance of $1-((s-1)/s)^n$ to hit on X with its choice. All in all for three privacy seekers to share an element the chance will be:

$$Pr[\text{Match: 123}] = Pr[\text{Match: 12}] * \left(1 - \left(\frac{s-1}{s}\right)^n\right)$$

And for t privacy seekers:

$$Pr[\text{Match: 12} \ldots t] = \left(1 - \frac{((s-n)!)^2}{(s-2n)!s!}\right) * \left(1 - \left(\frac{s-1}{s}\right)^n\right)^{t-2}$$

The chance for a shared element to be found in a setting of t>2 players is very low. Illustration: for ES of size s=10,000, and pick lists of size n=250, the bilateral match probability is 99.8% while the chance for three privacy seekers all netting a match is 2.4%. And for a group of t=5, the chance for a match drops to 0.0015%.

The goal of a shared secret for a group of t>2 privacy seekers is more efficiently achieved by securing bilateral secrets among the group, and then using the shared bilateral secrets to extend a shared group secret.

7.2 Bilateral Privacy in a Multi Party Setting

Let t privacy seekers, $PS_1, PS_2, \ldots PS_t$ exercise the FigLeaf protocol for the purpose of securing any matched secret between any of the t players. Let Pr[1-2 no match] be the chance for $PS_1$ and $PS_2$ not to have a match. For $PS_3$, we can compute a no match over the already selected $n_1$ and $n_2$ elements (the pick lists of $PS_1$ and $PS_2$ respectively). The first choice of $PS_3$ will have a chance of $(s-n_1-n_2)/s$, to be a "no match". For the second choice of $PS_3$ the chance of no match will be: $(s-n_1-n_2-1)/(s-1)$, and so on, for the i-th element of $PS_3$ the chance of no match will be: $(s-n_1-n_2-i+1)/(s-i+1)$. The persistent no match between the three privacy seekers will be the multiplication of these probabilities. And the match chance is the complement to one.)

$$Pr[\text{Any Match } PS_1, PS_2, PS_3] = 1 - \frac{(s-n_1)!(s-n_2)!(s-n_3)!}{(s-n_1-n_2-n_3)!(s!)^2}$$

This configuration amounts to double application of the "birthday effect", with remarkable results. Illustration: for an ES of size s=1,000,000 and $n_1=n_2=n_3=1000$ the regular bilateral chance for a match is 63%. For match between any two, the chance is 95%. And of course, the results become more dramatic for larger t values.

These results point to a very efficient way for a community of players in cyber space to create a mutually shared secret. They can first apply the 'any-which-way' procedure described herein, and create, say, one connection, between $PS_1$ and $PS_2$. Next the community will re-play the 'any-which-way' version of FigLeaf, with the exception that any two players who have already established a bi-lateral secret will not try to establish another one. For any instance where $PS_i$ connects to $PS_j$, while $PS_j$ connects to $PS_k$, $PS_j$ will readily connect $PS_i$ and $PS_k$, and the three will not have to seek another secret among them. When in a coming round of FigLeaf $PS_k$ connect to $PS_l$, then $PS_k$ will connect $PS_j$, and $PS_i$ with $PS_l$. The secure connection clusters grow very fast until everyone is securely connected to everyone. They will keep at it, until all are connected.

There are numerous cases when this situation applies: spontaneous rise of networks, dynamic cyber identities, etc.

7.3 Group-to-Group Privacy.

Consider two groups α and β, comprised of $α_1, α_2, \ldots$ and $β_1, β_2, \ldots$, players respectively. Each group is fully connected within itself, namely: sharing a group secret, but no α player is securely connected to any β player. To do so they may exercise the FigLeaf protocol between t representatives of each group, seeking a single match by each picking n elements in the ES. Any representative from any group will hope for a match with any representative of the opposite group. This will allow for $t^2$ possible bilateral connections, or to a match probability given by:

$$Pr[αβ-\text{match}] = 1 - \left(\frac{(s-n_a)!(s-n_b)!}{(s-n_a-n_b)!s!}\right)^{t^2}$$

where $n_a$ and $n_b$ is the size of the pick-lists of groups $\alpha$ and $\beta$ respectively.

Illustration: for $s=10^9$, $n_a=n_b=5000$. The regular bilateral probability for a match is 2.4%. For two groups, each deploying $t=10$ players, the chance for a match between anyone from one group with anyone from the other is 92%. By each group deploying more players to achieve the privacy, the effect of the procedure grows dramatically. Unlike, say, the Diffie Hellman solution, which is strictly bilateral, the FigLeaf privacy may be extended to group settings.

8.0 Zero-Knowledge of the 2nd Kind

A zero knowledge algorithm (of the first kind), is one where no information is leaked beyond what is revealed on purpose. However, the algorithm itself is "leaking". Complex algorithms, as are normally used in cryptography, harbor hidden vulnerabilities, that may require a great deal of mathematical digging to spot them. And in today's raging cyber war, leakage of the deployed algorithm may be catastrophic. A persistent adversary will exploit any intelligence about our operation, and hence it is our objective to leak as little as possible with respect to our cryptographic strategy. Lavish use of ad-hoc randomness is one potent strategy. We have today the technology to generate large quantities of quantum-grade randomness on demand. This denies our adversary the chance to somehow steal or reveal that randomness ahead of time of its usage.

The FigLeaf procedure calls for ad-hoc definition of the entropy set to deny an adversary the chance to study it, prepare, and thereby shrink our interval-of-privacy (IoP). But the FigLeaf procedure also calls for the deployed one way functions to be randomly selected, so that there will be no mathematical functions for our adversary to study, and find vulnerabilities in. This is zero-knowledge of the 2nd kind.

Three-D Printed FigLeaf Reference Set

This section describes a FigLeaf operation based on a physical shared reference set.

Introduction (3D Printed Brick)

The Reference Set in the FigLeaf protocol may be established in various categories:

A set comprised of abstract mathematical constructs
A set comprised of dedicated database elements
A set comprised of physical entities Here we describe a special class of physical entities that may comprise the FigLeaf reference set: a 3D-Resistance Variant contraption.

Basic description: Consider a three dimensional 'brick' with dimensions X,Y,Z corresponding to length, width, and height. Consider a "point element" inside the brick, identified by its coordinates $\{x,y,z\}$ where $0 \leq x \leq X$, $0 \leq y \leq Y$, $0 \leq z \leq Z$. The point element is a tiny element of the brick with dimensions dx, dy, and dz respectively. Let that "point element" be comprised of a material with electric resistance $\rho(x,y,z)$. Let $\rho(x,y,z)$ be a random value drawn from the interval $\rho_l$-$\rho_h$. Namely: $\rho_l \leq \rho(x,y,z) \leq \rho_h$.

Let A and B be two arbitrarily chosen points in the brick: $A\{x_a, y_a, z_a\}$, $B\{x_b, y_b, z_b\}$. One could readily measure the resistance, $R_{ab}$ between points A and B by applying a potential gradient $\Delta V_{ab}$ over the points A and B, and measuring the resulting current $i_{ab}$:

$$R_{ab} = \Delta V_{ab}/i_{ab}$$

$R_{ab}$ depends on the randomized resistance values of the points leading from A to B.

In theory, knowledge of the $\rho$ values throughout the brick would allow one to theoretically compute the resistance $R_{ab}$ between two arbitrary points A and B, but at present such a computation is exceedingly tedious, even with a perfect knowledge of the resistance distribution over the brick. By contrast, application of a voltage difference between A and B and measuring the resultant current will gauge that resistance fast and easy.

For a party who does not posses the value distribution of $\rho$, the randomized nature of $\rho$ will void any chance to compute or guess $R_{ab}$ with any probability above negligible.

Let Alice and Bob be two privacy seekers using the FigLeaf protocol to establish privacy in cyber space. Let us assume that both of them, each holds an identical copy of a brick as described above. Alice and Bob would then be able to exercise the FigLeaf protocol as follows:

Let Alice randomly select $n_a$ points throughout the brick, while Bob randomly selects $n_b$ points off the same identical brick. Alice will then select a projecting point $P1_a$ on the brick, and measure the $n_a$ resistance values, $R_{1p1}$, ... $R_{ip1}$, ... $R_{nap1}$, for $i=1, 2, \ldots n_a$. Namely Alice will measure the resistance values between each of her randomly selected points $1, 2, \ldots n_a$ and the projecting point P1.

Bob will also randomly choose $n_b$ points on the same brick. Alice will then communicate to Bob the coordinates of point P1, which will allow Bob to measure the $n_b$ resistance values between his randomly chosen points $1, 2, \ldots n_b$ and P1. Alice will then communicate to Bob the values of the $n_a$ resistance values she measured, which will allow Bob to discard all the points in his selection of $n_b$ points that have resistance values not listed in Alice's list. Bob's list of candidate will then shrink from $n_b$ to $n'_b$.

Then the roles of Alice and Bob will be switched. Bob will choose a projecting point $P2 \neq P1$, measure the resistance values between P2 and his current list of candidates for a match ($n'_b$ points), communicate P2 and the values of his measured resistances to Alice, and she will discard all the points she selected and that measured resistance values to P2 that were not listed in Bob's list.

And so on, according to the FigLeaf protocol.

As discussed above a privacy killer not in possession of the "brick" has virtually zero chance to interfere with the privacy establishment of Alice and Bob. As to a privacy killer in possession of the brick, the obstacles are the same as any other exposed reference set because clearly, as constructed, the brick is a FigLeaf reference set.

Once an electrode point has been identified as a shared selection between the privacy seekers, then the value of its coordinates on the brick may be the shared secret used by the privacy seekers, or, in turn, the privacy seekers may use a lookup table, or exercise an equivalent function to map the coordinates of the shared points to a different data item.

The FigLeaf Brick

The FigLeaf brick may take any three-dimensional or two-dimensional form, not necessarily a "brick-like" shape. What is required is for a bulk comprised of several materials intermixed in a randomized way, where these materials each has a different conductivity. This construction will create a situation where the resistance registered between two arbitrary points on the brick is determined by which materials are spread between these two points and at which boundaries. Measuring the resistance is fast and accurate. It is given as the ratio between the voltage difference between any two points on the brick and the resulting current.

The brick is deemed to be the reference set for the FigLeaf procedure, with the electrode-points identifying the elements of this reference set. An electrode-point is a well-defined point on the brick where an electrode may be placed. An electrode-point is defined by its coordinates: $\{x,y,z\}$.

Since both Alice and Bob need to repeat the same measurement it is necessary that the electrode points will be well defined. There are several ways to doing so, e.g.: to imprint on the surfaces of the bricks contact points with well defined coordinates. Such contact points could be imprinted inside the brick too.

Using common chip technology it would be common place to build some conductivity bricks, say, in a form of a cube comprised of six surfaces, where each surface will have $10,000 \times 10,000 = 10^8$ electrode points or more and together $6*10^8$ points.

The most advanced way to construct the brick is to use 3D printing. A perfectly randomized function will define the mix of some m types of materials comprising the brick. Once the desired number of bricks has been printed, the mold is discarded, namely the randomized function that governed the printing is destroyed so no more identical bricks can be built. A 3D printed bricks will be very hard to reverse engineer, and redefine the printing function in order to build a copy of the brick. The motivation to do so is low because even a hacker aware of the brick will be held back by the protocol.

Operating the 3D printer, all the multi-variant conductivity materials will be available for spot printing to ensure any desired resolution of mixing between the constituent materials of the brick.

FigLeaf Brick Operation

Alice and Bob, each having an exact copy of the FigLeaf brick is each selecting n electrode points on it (for the case where $n=n_a=n_b$). Then Alice picks some other electrode point—the projecting point and measures the resistances between it and each of her randomly selected choices. She communicates the address of the projecting point and the resistance measurements to Bob. Bob regards those resistance measurements as properties of the selected electrode points and proceeds according to the FigLeaf procedure.

To insure coordinated measurements Alice and Bob may divide the maximum range resistance reading to h intervals, and replace the exact measurement with the interval in which it falls. If a measurement falls very close to the boundaries of an interval then the party that sends the measurements to the other identifies the two intervals to cover for the possibility of a slight measurement error. It will slow a bit the procedure, but will insure accuracy.

To counter however slight differences in measurement owing to temperature variations, or electro-magnetic field variance, the procedure could be modified by selecting two reference points on the brick: S $(x_s, y_s, z_s)$ and Q $(x_q, y_q, z_q)$, the resistance between these two point $R_{qs}$, will be measured and will be used to normalize the resistance measurements of the protocol, by dividing the computed resistances in the protocol to $R_{qs}$.

Each point on the brick will be associated with a numeric value that may be computed from its location address on the brick, this numeric value will be the shared secret of the privacy seekers, or the basis from which a shared secret is derived.

The use of the brick may be (i) private, (ii) semi private, or (iii) public. In the private setting two privacy seekers will arm themselves each with an exact copy of a brick that was 3D printed from an ad-hoc random number generator that was applied twice, and then discarded, to prevent any more copies. While the privacy seekers could use the data extracted from the brick directly as a source of their privacy, they would add a layer of security by using the brick in the FigLeaf protocol. A semi private mode is where a group of players all share a brick, which they keep secret from others. This brick will allow any two players in that group to communicate privately using the FigLeaf protocol. Others in the group could in theory mount a heavy-duty hacking effort, but are not expected to. If they do, they will fail, if the privacy seekers operate as described herein, namely with sufficient combinatorics defense. In the public mode one may envision assorted bricks available for sale, so that any two strangers may agree to use the same public brick to exercise the FigLeaf protocol. The assortment of bricks will make it extremely difficult for any party to crack and compromise every possible brick as it appears on the market.

In general we have with FigLeaf two rings of security— security against attackers not in possession of the brick and security against attackers who do possess the brick. The first kind is well protected from because of the randomized nature of the brick, and the second kind is protected against by the calculus of combinatorics.

Hacking the FigLeaf Brick

The simple way to hack the FigLeaf brick is to follow on the dialogue between the privacy seekers, and then apply the information over the brick (referring to an attacker in possession of the brick). The difficulty before the hacker is well known to the privacy seekers, it is expressed via the number of possible electrode points, and the time needed to exercise a measurement of current between any two electrode points. The hacker will learn that the n electrode points randomly selected by a privacy seeker measured n current values relative to a projection point, also communicated in the open. Since this communication point was not identified before, the hacker could not have pre-measured those currents and build a hacking database for it. It is theoretically possible for a hacker holding the brick to pre-measure the currents between any possible electrode point to any other electrode point, which will require a database of the size of the square number of electrode points on the brick.

Given a brick, in the current technology, it is very difficult to measure and determine its composition in sufficient accuracy, and more difficult to build one, using the 3D printing technology or any other technology. It is also not feasible today to theoretically compute the current measurements between two random points of the brick (with sufficient accuracy). The power of the brick is in part due to the fact that it is easy to write a 3D printing instruction set, fed and powered by a stream of perfectly randomized bits, but it is nearly impossible to duplicate the brick without the possession of the generating random bits, which are to be destroyed and discarded after printing the desired number of bricks.

The brick may be reduced to a two dimensional setting, which will make it easier to implement and build, the principles will stay the same

$$R = \Delta V / i$$

Figure 1A:
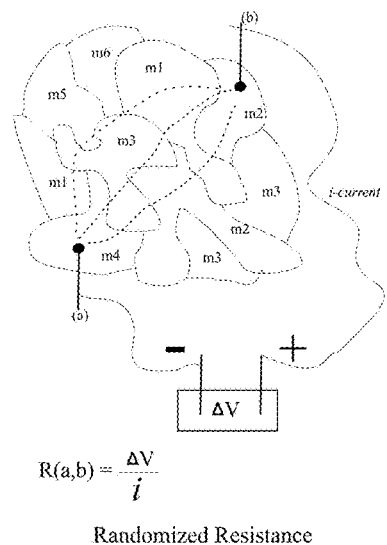
FIG. 1a Randomized Resistance: The figure illustrates the packed "FigLeaf brick" comprised of randomizes chunks of materials m1, m2, m3, m4, m5, m6 characterized by having different and unique electric resistance. The figure shows two arbitrary points in the brick: (a) and (b) to which a voltage difference ΔV is being applied. The voltage difference creates an electric current i which reflect the randomized combination of semi-conducting and varying conducting materials (m1, m2, . . . ). The exact current reflects the exact geometry of the packed varying conductivity materials (m1, m2 . . . ). The measurement is fast and accurate, and allows one to calculate the effective resistance between the two points (a) and (b)
Figure 1B:
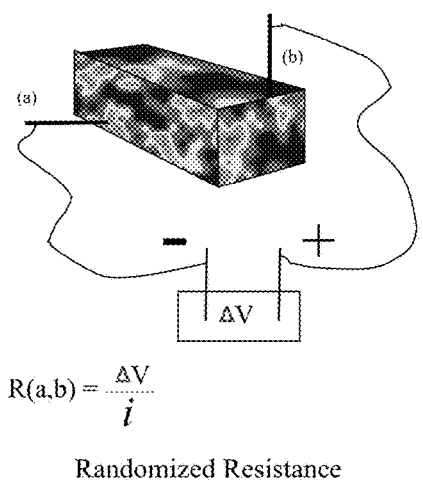
Figure 1C:
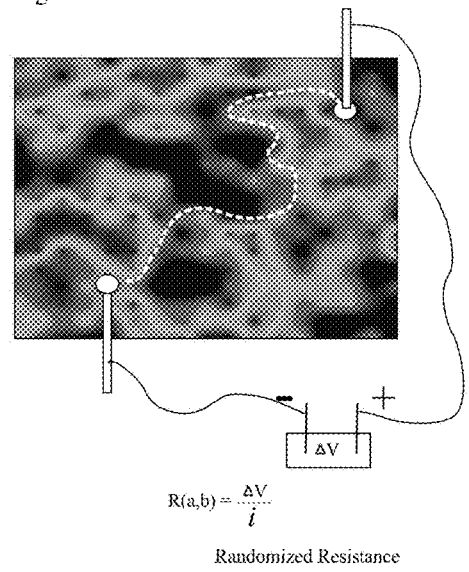

FIG. 1b: Randomized Resistance: this figure shows the same concept of connecting two arbitrary points on the FigLeaf brick to a set potential difference, ΔV. Here the brick is shown in 3D projection, and the randomized packing of the varying conductivity materials are shown in color. an FIG. 1c: Randomized Resistance: here is a third depiction of the same concept. It emphasizes that the current seeks the easiest path across the packed varying conductivity materials, and the value of the current reflects the packing of the varying conductivity materials between the two points to which a potential difference is applied.

FIG. 2: The FigLeaf Brick with marked Electrode Points: This figure illustrates the imprinting of a grid (shown diagonally) that identifies points on the brick (only one face is marked), each crossing point reflects an address of a unique point that can be selected by Alice or Bob in their randomized selection of brick points.

FIG. 3: Marked Randomized Selection by Privacy Seekers: this figure depicts a face of marked electrode points (represented as white rectangular) on the FigLeaf brick. The points selected by Alice are marked with the letter "a", and the points selected by Bob are marked with the letter "b". The figure shows that "by chance" the two sets of a points and b points (both sets selected randomly) have one electrode-point in common (marked with the red circle).

FIG. 4: Alice Chooses a Projection Point (p) and Measures the Respective Currents: The figure shows how Alice determines the values of a given property over its set of randomly selected points on the FigLeaf brick. The property Alice chooses is the current, or resistance displayed between the selected project point p, and each of Alice's selection points on the brick. The respective currents are shown as dotted lines between "p" and each and every points on Alice's selection.

FIG. 5: Bob Chooses a Projection Point (p)d and measures the respective currents: The figure shows how Bob determines the values of a given property over its set of randomly selected points on the FigLeaf brick. The property Bob chooses is the current, or resistance displayed between the selected project point p, and each of Bob's selection points on the brick. The respective currents are shown as dotted lines between "p" and each and every points on Bob's selection.

Figure 6:
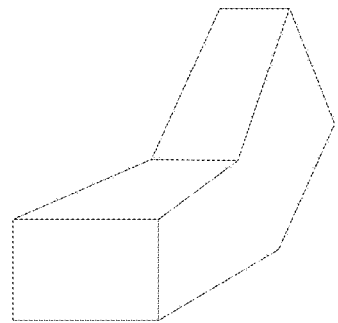

FIG. 6: A FigLeaf Brick of Randomized Shape: this figure shows a FigLeaf brick built not like a traditional brick, but as a structure of eight faces. It shows that the brick can be of any shape or size, as long as it has well defined electrode points and its material is a randomized compaction of conductance-varying materials.

Figure 7:
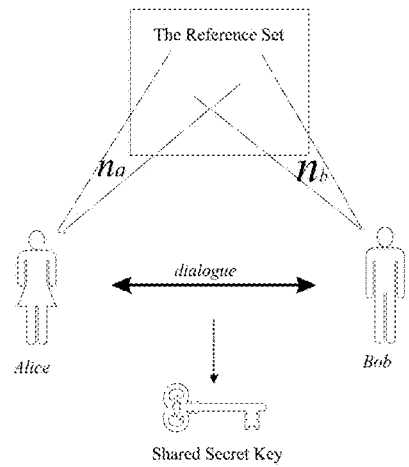

FIG. 7: FigLeaf Spontaneous Security (The Public Reference Set): this figure depicts the FigLeaf protocol: it shows a reference set from which both Alice and Bob make randomized selections of $n_a$, and $n_b$ elements respectively. A double arrow shows that after the selections were made Alice and Bob launch a dialogue that singles out the elements they have both chosen randomly, and this element becomes their private shared key (until a hacker, exposed to the reference set will catch up with them).

Figure 8:
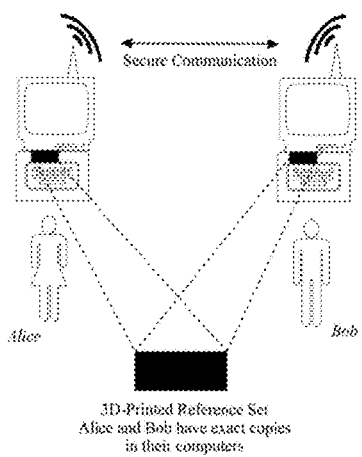

FIG. 8: FigLeaf Spontaneous Security: Private or Semi Private Reference Set: This figure shows two privacy seekers Alice and Bob, each having a physical FigLeaf "brick" in their computer, where their bricks are identical, so their measurements of currents and resistances from the corresponding electrode points are the same, and hence they can exercise the FigLeaf protocol, each over his or her FigLeaf brick.

Figure 9:
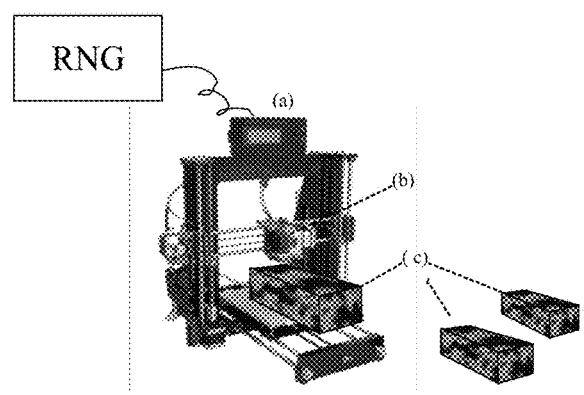

FIG. 9: 3D Printing of FigLeaf Bricks: this figure shows a 3D printer guided by a top computing device, which in turn is fed by a random number generator, so that the packing of the conductivity varying materials will be done in a fully randomized (unpredictable) way. The figure shows one FigLeaf brick just finished printing, and tow identical others printed earlier.

Figure 10:
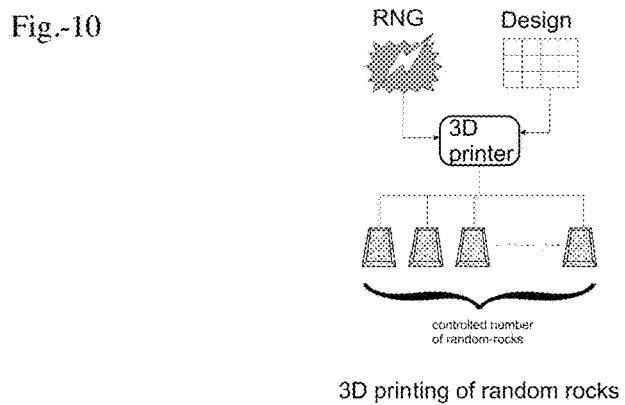

FIG. 10: 3D Printing of Random Rocks

The drawing shows a 3D printer receiving (i) deterministic design information, and (ii) ad-hoc random input that combines into the exact printing instructions, which are repeated to manufacture a limited number of duplicates of the "randomness rock" which is then distributed to the parties of a secure communication group.

Figure 11:
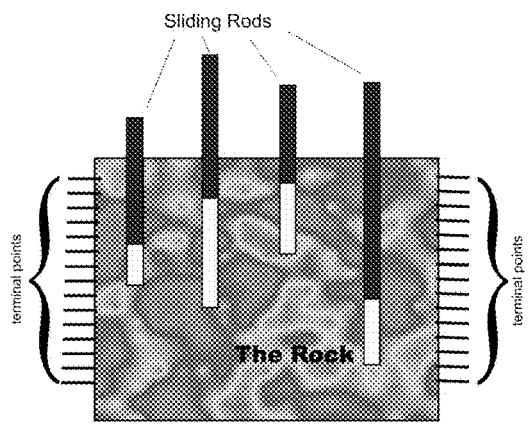

FIG. 11: Randomness Enhancing Sliding Rods

Figure 12:
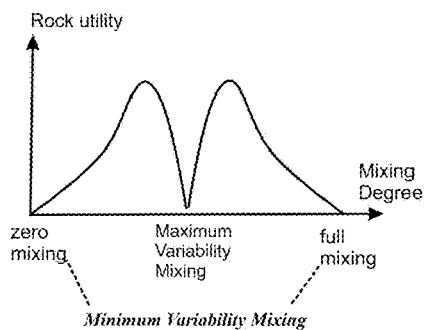

Figure shows a random rock fitted with disruptive sliding rods which can be fitted in various sliding positions, which in turn affect the resistance reading between any two terminal points FIG. 12: Rock Utility v. Mixing Degree The graph shows the utility of the mixing per mixing degree. Full mixing, and no mixing are of the lowest utility. The mathematical "best" is of low utility. The in-between degrees have a high utility.

FIG. 13: Defining an Encapsulating Box

The figure shows how to construct a "box" by shrinking the outer form of the rock, and placing the shrunk entity inside, such that their center points coincide, and their faces are parallel.

FIG. 14: Defining Onion Rings in a Random Block

The figure shows how to define "boxes" that comprise the random rock: repeatedly shrinking the original random rock, and placing the shrunk structures inside each other. This defines concentric forms—the boxes.

FIG. 15: Lattice Based Division of a Box to Blocks

The picture shows how to define "blocks" in a "box" in a random rock. Using lattice marking on the inner surface and projecting perpendicular to the outer surfaces.

FIG. 16: Lattice Based Division of a Rock

The figure shows a rock divided to concentric "boxes" where each box is divided to blocks based on lattice markings.

FIG. 17: Random Shaped Blocks Fill the Rock

The figure shows how the volume of the rock is being occupied by randomly shaped, randomly sized blocks FIG. 18: The "Cone" Method for Dividing Random Rock Boxes to Blocks The figure shows how randomly sized cones, with joined heads at the center point of the rock are dividing the "boxes" of the rock into randomized blocks.

FIG. 19: "Hopper" method to dividing the rock into blocks

The figure depicts the mathematical operation in which random "blocks" are tossed around inside a rock, until randomly the hopping concludes, and thereby defines division of the random rock into blocks, where each block is to be filled by a randomly selected comprising material.

FIG. 20: Fitting Adjacent Terminals with Materials of highly different conductivity The figure depicts the difference between wrapping up adjacent terminals with similar conductivity materials versus dissimilar conductivity materials. The latter alleviates the proximity effect, which may lead to information leakage.

FIG. 21. Variable Depth Pins blur Physical Proximity Information between terminal points The figure shows pins of various lengths associated with neighboring terminals to blur the proximity effect.

FIG. 22: Variable Length Pins—Opposite Faces

This figure shows the blurring impact of variable size pins fitted over facing terminal points. Without the pins the resistance between terminal points c and g, r(c,g), would be close to the resistance measured between c and f: r(c,g)~r(c,f). However, because of the pin, point g becomes g' and point f becomes f', where r(c,g')≠r(c,f').

FIG. 23: Variable Length Pins—Multi Face

This figures shows how disruptive pins are inserted in terminals fitted on all the faces of the random rock.

FIG. 24: Variable Depth Pins over Ball Shaped Rock

This figure depicts how disruptive pins may be fitted in a ball shaped rock

Figure 25:
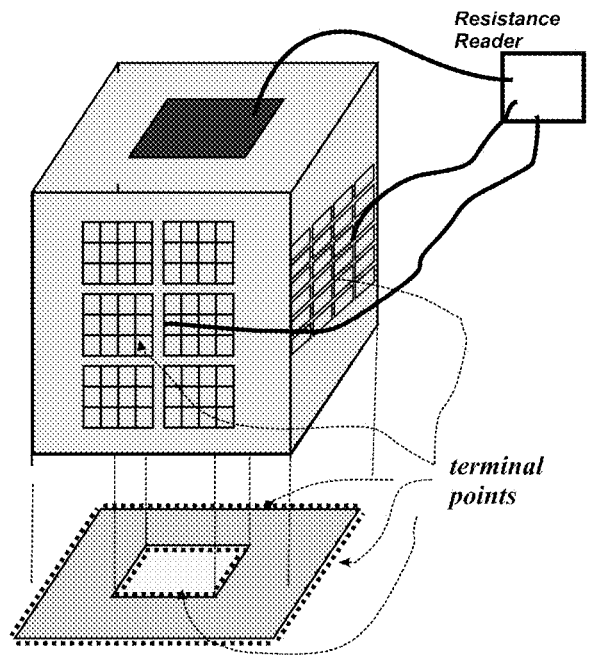

FIG. 25: A Simple Topological Randomness Rock

This figure shows how a topological rock is covered with terminal array on all, or most of its faces, including faces defined by the 'topological hole' in the rock.

Figure 26:
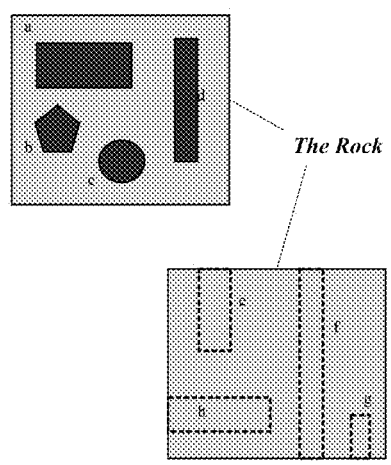

FIG. 26: Complex Topology Randomness Rocks

The figure shows a randomness rock with holes of different shapes and different orientations which do not overlap.

Figure 27:
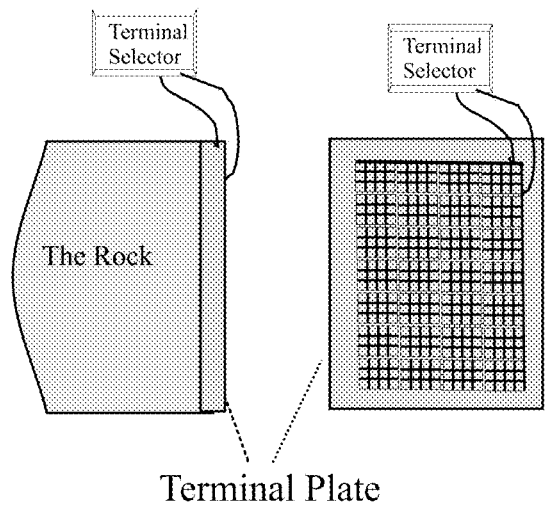

FIG. 27: Terminal Plate

This figure shows a terminal plate attached to a face of the rock, and marked by intersecting lines that define terminal points.

Figure 28:
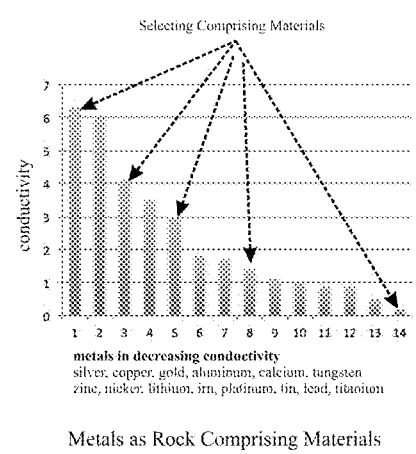

FIG. 28 Metals as Rock Comprising Materials

This figure shows a graph of conductivity values for various metals, with indication of choice of metals such that the conductivity differences will be similar.

FIG. 29 Random Rock Assembly

The figure shows at the top a finished Rock assembly where one can fit a battery pack, and connect input wires to state the query and also output wires to read the response to the query. At the bottom the figure shows the functional elements in the Rock assembly: the rock itself (on the left), then the reading circuitry, followed on the right with the operational control center.

FIG. 30 Rock Relay Mode

The figure depicts how one shared rock may be used to securely share printing information for the next rock, to be 3D-printed by each party separately, and so repeatedly indefinitely. When a rock is exhausted, it is replaced by a new one.

What is claimed is:

1. A three-dimensional (3D) electrical device that provides a different measured electrical resistance between any two points on the device, comprising:
   a plurality of 3D blocks, wherein each block of the plurality of 3D blocks has a different electrical conductivity, is made up of one or more materials, and is selected in a random order and connected to a previously selected block of the plurality of 3D blocks to form a larger 3D shape so that a different electrical conductivity is produced between any two points of a plurality of points on at least one surface of the 3D shape; and
   a plurality of electrodes placed on the at least one surface of the 3D shape so that each electrode of the plurality of electrodes is connected to a point of the plurality of points in order to enable a measurement of resistance between any two electrodes of the plurality of electrodes.

2. The device of claim 1, wherein the plurality of 3D blocks comprise a plurality of six sided 3D bricks.

3. The device of claim 2, wherein 3D shape comprises a cube.

4. The device of claim 3, wherein plurality of six sided 3D bricks and the cube are 3D printed.

5. The device of claim 1, wherein each block of the plurality of 3D blocks is manufactured in a three-dimensional printing process where the printing is carried out with materials of varying degrees of electrical conductivity, which are mixed according to instructions that are comprised of deterministic design parameters further specified with random data, thereby manifesting the printer input randomness in the manufactured 3D shape, extracted through random readings of electrical conductivity between two arbitrary points on the surface of the 3D shape.

6. The device of claim 1, wherein 3D shape is fitted with electronic circuitry that creates a desired voltage difference between two arbitrary points on the at least one surface of the 3D shape, $\Delta V$, that results in a measured current I, from which the respective resistance $r=\Delta V/I$ is computed, and then converted to an integer, $\rho=\text{floor}(r/T)+1$, where floor(r/T) is the integral part of the division of r by T, where T is an arbitrary resolution interval.

7. The device of claim 6, wherein the at least one surface is marked with n terminal points, such that a user can specify two points i, and j, i≠j, 1≤i, j≤n, and receive in return a random integer N, 1≤N≤H, in the range 1-H, computed as $N(i,j)=\rho(i,j)$ MOD H, where $\rho(i,j)$ is computed from $r(i,j)=\Delta V/I$.

8. The device of claim 6, wherein the at least one surface is marked with n terminal points that are divided to two groups, $n_1$, and $n_2$, $n=n_1+n_2$, such that a user can specify one terminal point from the first group, i, and one terminal point from the other group, j, $1\leq i\leq n_1$, $1\leq j\leq n_2$, and receive in return a random integer N, 1≤N≤H, in the range 1-H, computed as $N(i,j)=\rho(i,j)$ MOD H, where $\rho(i,j)$ is computed from $r(i,j)=\Delta V/I$.

9. The device of claim 1, wherein the 3D shape is divided to three-dimensional sections of pre-selected shapes, the size, orientation, and position of which is determined by random input so that each point in the 3D shape is associated with one section among these non-intersecting sections, and each section so geometrically defined is filled with one of the comprising materials, the selection of which is dictated by random input.

10. The device of claim 1, wherein the one or more materials comprise metals.

11. The device of claim 1, wherein the one or more materials comprise macromolecules induced (seeded) with graphite and/or other additives that create materials of desired conductivity, thereby establishing a desired span of conductivity among the selected materials, while avoiding a selection of materials with conductivities that are too close to each other.

12. The device of claim 1, wherein the one or more materials are engineered through nanotechnology to establish a broad span of conductivity, while avoiding a selection of materials with conductivities that are too close to each other.

13. The device of claim 1, wherein the 3D shape comprises a brick, a polyhedra, or a ball.

14. A method for providing a different measured electrical resistance between any two points on a three-dimensional (3D) electrical device, comprising:
   selecting in a random order each block of a plurality of 3D blocks, wherein each block of the plurality of 3D blocks has a different electrical conductivity and is made up of one or more materials;
   connecting each selected block to a previously selected block of the plurality of 3D blocks to form a larger 3D shape so that a different electrical conductivity is produced between any two points of a plurality of points on at least one surface of the 3D shape; and placing a plurality of electrodes on the at least one surface of the 3D shape so that each electrode of the plurality of electrodes is connected to a point of the plurality of points in order to enable a measurement of resistance between any two electrodes of the plurality of electrodes.

15. The method of claim 14, wherein the plurality of 3D blocks comprise a plurality of six sided 3D bricks.

16. The method of claim 15, wherein 3D shape comprises a cube.

17. The method of claim 16, wherein plurality of six sided 3D bricks and the cube are 3D printed.

* * * * *